US008768243B2

(12) United States Patent
Lindahl et al.

(10) Patent No.: US 8,768,243 B2
(45) Date of Patent: *Jul. 1, 2014

(54) POWER MANAGEMENT TECHNIQUES FOR BUFFERING AND PLAYBACK OF AUDIO BROADCAST DATA

(71) Applicant: Apple Inc., Cupertino, CA (US)

(72) Inventors: Aram Lindahl, Menlo Park, CA (US); Richard Michael Powell, Mountain View, CA (US); Joseph M. Williams, Dallas, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,048

(22) Filed: Dec. 21, 2012

(65) Prior Publication Data

US 2013/0109339 A1 May 2, 2013

Related U.S. Application Data

(63) Continuation of application No. 12/541,820, filed on Aug. 14, 2009, now Pat. No. 8,346,203.

(51) Int. Cl.
*H04H 20/71* (2008.01)
*H04B 1/38* (2006.01)
*H04B 1/16* (2006.01)

(52) U.S. Cl.
USPC ... 455/3.01; 455/3.04; 455/343.1; 455/343.5; 455/574; 713/320

(58) Field of Classification Search
USPC ............ 455/3.01–3.06, 127.1, 127.5, 455/343.1–343.5, 412.1, 574; 713/320
See application file for complete search history.

(56) References Cited

U.S. PATENT DOCUMENTS

| 5,083,310 | A | 1/1992 | Drory |
| 5,386,493 | A | 1/1995 | Degen et al. |
| 5,742,599 | A | 4/1998 | Lin et al. |
| 6,573,846 | B1 | 6/2003 | Trivedi et al. |
| 6,606,388 | B1 | 8/2003 | Townsend et al. |
| 6,865,653 | B2 * | 3/2005 | Zaccarin et al. ............ 711/154 |
| 7,055,049 | B2 | 5/2006 | Atkinson |

(Continued)

OTHER PUBLICATIONS

U.S. Appl. No. 12/541,768, filed Aug. 14, 2009, Aram Lindahl et al.

(Continued)

*Primary Examiner* — Simon Nguyen
(74) *Attorney, Agent, or Firm* — Blakely, Sokoloff, Taylor & Zafman LLP

(57) ABSTRACT

Various techniques that relate to prolonging the battery life on a portable electronic device during the buffering and playback of audio broadcast data are provided. In accordance with disclosed embodiments, upon detecting a low power state, the device may implement one or more low power actions, including starting, continuing, or stopping one or more audio broadcast functions, such as buffering or playing back audio broadcast data, to reduce overall power consumption, and thus prolong battery life. In one embodiment, a user may specify one or more low power actions that are to be implemented during a low power state by configuring user settings stored on the device. In another embodiment, the device, upon detecting a low power state, may prompt the user to make a selection from a listing of selectable low power action options and perform the selected low power action.

21 Claims, 14 Drawing Sheets

(56) References Cited

U.S. PATENT DOCUMENTS

| | | | |
|---|---|---|---|
| 7,426,417 | B1 | 9/2008 | Cannistraro et al. |
| 7,430,675 | B2 | 9/2008 | Lee |
| 7,453,938 | B2 | 11/2008 | Haskell et al. |
| 7,584,312 | B2 * | 9/2009 | Kuroda et al. ............... 710/52 |
| 7,734,310 | B2 | 6/2010 | Kondo et al. |
| 7,778,838 | B2 * | 8/2010 | Sebestian et al. ............ 704/500 |
| 2003/0021198 | A1 * | 1/2003 | Millikan et al. ............ 369/47.3 |
| 2004/0042768 | A1 * | 3/2004 | Momose ...................... 386/111 |
| 2004/0106424 | A1 * | 6/2004 | Yoshizawa .................. 455/522 |
| 2005/0210101 | A1 | 9/2005 | Janik |
| 2005/0213929 | A1 * | 9/2005 | Cheng ............................ 386/46 |
| 2005/0229222 | A1 * | 10/2005 | Relan et al. ................... 725/100 |
| 2006/0129861 | A1 * | 6/2006 | Kee et al. ...................... 713/323 |
| 2006/0221788 | A1 | 10/2006 | Lindahl et al. |
| 2007/0083467 | A1 | 4/2007 | Lindahl et al. |
| 2007/0136522 | A1 * | 6/2007 | Umemura et al. ............ 711/113 |
| 2008/0057894 | A1 | 3/2008 | Aleksic et al. |
| 2008/0133956 | A1 | 6/2008 | Fadell |
| 2008/0168294 | A1 | 7/2008 | Batson et al. |
| 2008/0168470 | A1 | 7/2008 | Bushell et al. |
| 2008/0188209 | A1 | 8/2008 | Dorogusker et al. |
| 2008/0201587 | A1 | 8/2008 | Lee |
| 2008/0212884 | A1 * | 9/2008 | Oneda et al. .................. 382/232 |
| 2008/0288802 | A1 * | 11/2008 | Fleck et al. ................... 713/324 |
| 2009/0003115 | A1 | 1/2009 | Lindahl et al. |
| 2009/0005891 | A1 | 1/2009 | Batson et al. |
| 2009/0060446 | A1 | 3/2009 | Holden et al. |
| 2009/0073005 | A1 | 3/2009 | Normile et al. |
| 2009/0180412 | A1 | 7/2009 | Albert et al. |
| 2010/0146312 | A1 * | 6/2010 | Liao .............................. 713/310 |

OTHER PUBLICATIONS

U.S. Appl. No. 12/541,803, filed Aug. 14, 2009, Aram Lindahl et al.

U.S. Appl. No. 12/140,976, filed Jun. 17, 2008, Timothy J. Millet et al.

PCT/US2009/043319, May 11, 2009, Apple Inc.

* cited by examiner

POWER MANAGEMENT TECHNIQUES FOR BUFFERING AND PLAYBACK OF AUDIO BROADCAST DATA

CROSS-REFERENCE TO RELATED APPLICATIONS

The present disclosure is a divisional application of U.S. patent application Ser. No. 12/541,820 entitled "Power Management Techniques for Buffering and Playback of Audio Broadcast Data," filed Aug. 14, 2009.

BACKGROUND

The present disclosure relates generally to the buffering and/or playback of audio broadcast data on an electronic device and, more particularly, to various power management techniques that may be applied to the buffering and/or playback of audio broadcast data when the electronic device is operating in a low power state.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Radio programming, which may include both terrestrial broadcasts (e.g., AM, FM) and satellite broadcasts (e.g., XM Satellite Radio and Sirius Satellite Radio, both currently operated by Sirius XM, Inc., of New York City, N.Y.), typically broadcasts a wide variety of content, such as music, talk shows, sporting events, news programs, comedy programs, and drama programs, to name just a few. Further, with the exception of some subscription-based satellite radio services, most radio broadcasts are generally free of cost and readily accessible through most electronic devices that include an appropriate receiver, such as an antenna, and tuning components for selecting a particular radio frequency or band of frequencies. For instance, electronic devices that provide for the playback of radio programs may include non-portable electronic devices, such as a stereo system in a home or automobile, as well as portable electronic devices, such as portable digital media players having integrated radio antenna(s) and tuners. Accordingly, due to the diversity of available programming content and the relative ease of access to radio broadcasts, many individuals listen to the radio throughout the day as a form of entertainment (e.g., sporting events, talk shows) or leisure (e.g., music broadcasting), or for informative purposes (e.g., news reports).

Typically, radio programming follows a predetermined broadcast schedule, such that each program is broadcasted at a particular scheduled or designated time. Thus, in order to listen to a live broadcast (e.g., in real-time) of a particular radio program, an individual would generally need to be tuned to the particular station at the scheduled time of the radio program. However, there may be times at which an individual may not be able to tune in to a particular radio program at the start of its designated broadcast time, thus missing all or a portion of the program. As such, it may be convenient to provide techniques by which radio broadcasts may be buffered (e.g., stored) on an electronic device for playback at a later time. Additionally, some electronic devices, particularly portable electronic devices, may operate on a limited supply of battery power and, therefore, may encounter instances in which there is insufficient power to buffer and playback the entirety of a selected radio program.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for prolonging battery life on a portable electronic device when performing buffering and/or playback functions relating to audio broadcast data when the device is operating in a low power state. In accordance with disclosed embodiments, the electronic device, upon detection of the low power state, may be configured to implement one or more low power actions, which may include starting, continuing, or stopping one or more device functions, such as buffering or playing back audio broadcast data. In one embodiment, a user may configure the low power actions that are to be implemented during low power states by accessing and configuring one or more user settings, which may be stored on the device. In another embodiment, the device may, upon detecting a low power state, prompt the user to select a low power action from a displayed listing of selectable low power action options. In such embodiments, the device may subsequently perform the low power action selected by the user. As will be appreciated, one or more aspects of the power management techniques described herein may be configured using a graphical user interface displayed on the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of the present disclosure may be better understood upon reading the following detailed description and upon reference to the drawings in which.

DETAILED DESCRIPTION OF SPECIFIC EMBODIMENTS

Figure 1:
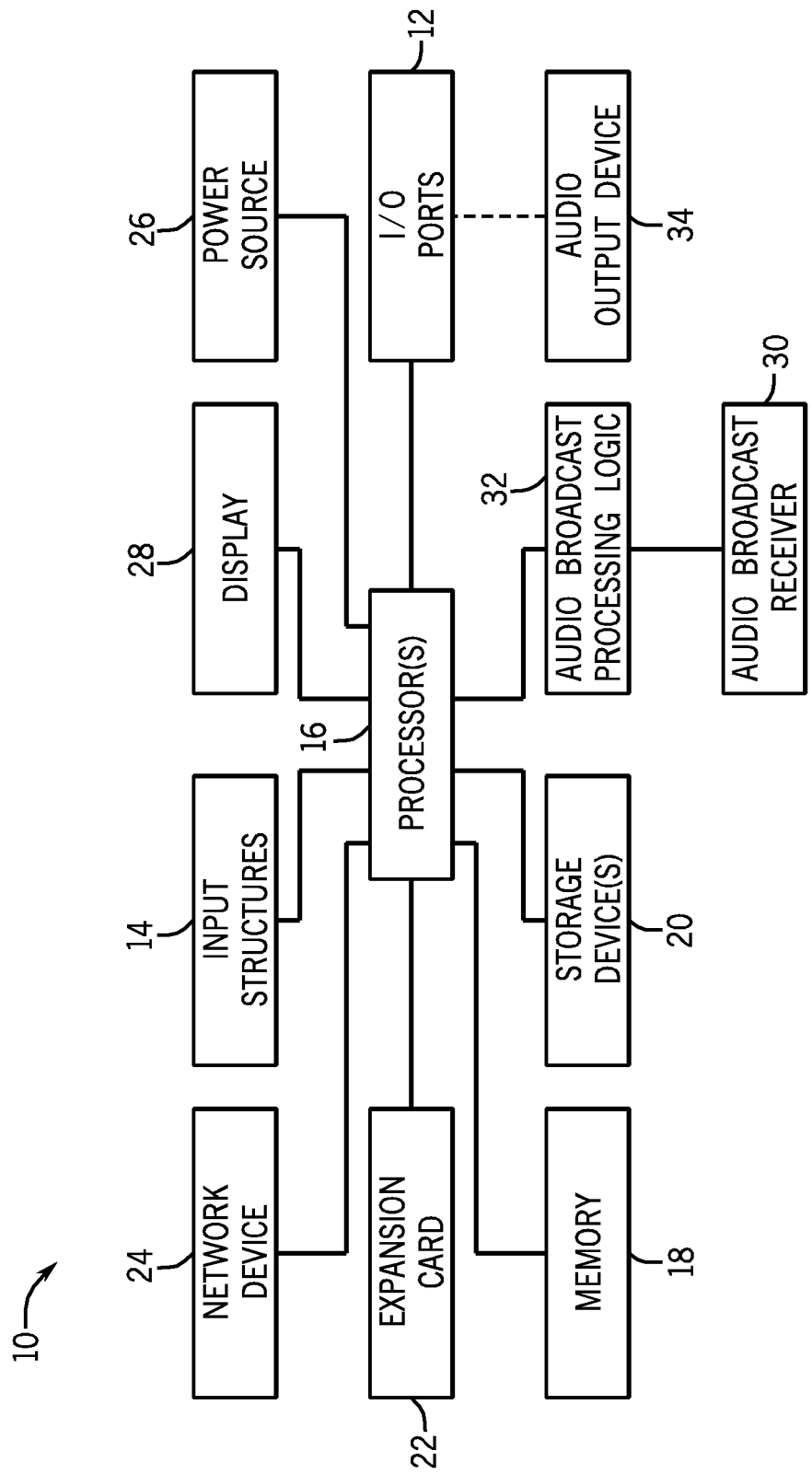
FIG. 1 is a block diagram of an electronic device that includes processing logic configured to provide for the buffering and playback of audio broadcast data and to implement certain low power actions when the electronic device is in a low power state, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, because radio programs are typically broadcasted at designated times regardless of whether or not a listener is tuned to the corresponding broadcast station (e.g., using an electronic device with a receiver), there may be instances in which the listener, due to schedule conflicts, is unable to hear the entirety of the broadcasted radio program. As such, it may be convenient to provide techniques by which radio broadcasts may be buffered (e.g., stored) on the electronic device for playback at a later time. For example, in one embodiment, the electronic device may be configured to buffer the radio program beginning from the start of its scheduled broadcast time. This may include encoding and storing a digital representation of the radio program on the electronic device. Thus, a listener that is unable to tune in and listen to the radio program as it is being broadcasted in real-time may still listen to the entirety of the program at a later time by playing back the buffered radio program on the electronic device. For example, in instances where buffered playback begins while the live broadcast is still occurring, the electronic device may continue to buffer the live broadcast while decoding and playing back earlier buffered portions of the radio program.

Additionally, since some electronic devices, particularly portable electronic devices, operate on a limited supply of battery power, it may also be beneficial to provide power management techniques that may be implemented during the buffering and/or playback of the audio broadcast to extend battery life. Accordingly, the present disclosure provides various techniques for the implementation of certain "low power actions," which may be applicable to the buffering and/or playback of audio broadcast data when it is determined that an electronic device is operating in a low power state. As will be discussed further below, such low power actions may be configured by a user, or may be determined by the electronic device and presented to the user for selection (e.g., using a graphical display and interface) when a low power state is detected. To provide a brief example, low power actions may be performed by the electronic device when the available charge remaining in a power source, such as a battery, drops below certain threshold. In one scenario, an electronic device that is in the process of buffering an audio broadcast while concurrently playing back an earlier portion of the audio broadcast may, upon detecting a low power state, stop playback while continuing to buffer the remainder of the audio broadcast. As will be appreciated, this may prolong the battery life of the electronic device, whereby power that would have otherwise been used for continuing playback functions may be diverted to increasing the amount of time that the device may continue to buffer the audio broadcast before the battery is completely depleted. In another scenario, the electronic device may stop buffering and playback functions altogether, and switch over to outputting the live audio broadcast stream.

Before continuing, several of the terms used throughout the present disclosure will be first defined in order to facilitate a better understanding of disclosed subject matter. For instance, as used herein, the term "audio broadcast," "audio program," "radio broadcast," "radio program," or the like, shall be understood to encompass both terrestrial broadcasts (e.g., via frequency modulation (FM) or amplitude modulation (AM)) and satellite broadcasts (e.g., XM® or Sirius®, both currently operated by Sirius XM, Inc.). Additionally, it should be understood that FM and AM broadcasting may include both conventional analog broadcasting, as well as newer digital terrestrial broadcast standards, such as HD Radio® (e.g., using in-band on-channel (IBOC) technologies) or FMeXtra®, for example.

Also, as used herein, the term "buffering" or the like shall be understood to refer to the creation and storage (e.g., temporary or persistent) of a digital representation of a live audio broadcast on an electronic device, and the term "playback" or "buffered playback" or the like shall be understood to refer to the playback of the stored digital representation on the electronic device. As will be appreciated, buffering may include one or more of receiving, encoding, compressing, encrypting, and writing audio data to a storage device, and playback may include retrieving the audio data from the storage device and one or more of decrypting, decoding, decompressing, and outputting an audio signal to an audio output device.

Additionally, the term "live," as applied to radio broadcasts, should be understood to mean the act of transmitting radio waves representing a particular radio program, which may be accomplished using terrestrial radio towers, satellites, or through a network (e.g., the Internet). A live broadcast may correspond to substantially real-time events (e.g., news report, live commentary from a sporting event or concert) or to previously recorded data (e.g. replay of an earlier-recorded live radio program). Thus, to be clear, while the actual content of a radio broadcast may not necessarily correspond to live events (e.g., occurring in substantially real-time), the transmission of the broadcasted audio data is "live" in the sense that such transmissions are occurring in substantially real-time.

Further, the term "low power state" or the like shall be understood to refer to a state in which the total power available to the electronic device has dropped below a certain threshold (which may be preset by a manufacturer and/or configured/re-configured by a user), and the term "normal power state" or the like shall be understood to refer to when the device is not in a low power state, such as when the total power available is above the low power threshold. Additionally, where low power thresholds or remaining available power values are expressed in the present disclosure as percentages (e.g., 10%, 15%, 20%, etc.), it should be understood that such values refer to a percentage relative to the total charge capacity of a power source (e.g., a battery). Thus, a low power threshold of 20%, for example, means that a low power state will occur when a power source is depleted to 20% of its total charge capacity. Accordingly, it should be understood that the terms "low power settings," "low power options," or "low power actions," or the like, are intended to refer to certain operational tasks and functions that may be performed by the electronic device when a low power state is detected. For instance, the performance of a low power action may include starting, continuing, or stopping one or more device functions, such as buffering or playing back audio broadcast data. In accordance with aspects of the presently disclosed techniques, such low power actions are generally aimed at reducing overall power consumption relating to the buffering and/or playback of audio broadcast data and, accordingly, prolonging battery life until the battery can be recharged, or until an alternate source of power is provided.

Keeping the above points in mind, FIG. 1 is a block diagram illustrating an example of an electronic device 10 that may provide for the buffering and playback of a broadcasted audio program, in accordance with aspects of the present disclosure. Electronic device 10 may be any type of electronic device, such as a portable media player, a laptop, a mobile phone, or the like, that includes a receiver (e.g., 30) configured to receive audio broadcast data. By way of example only, electronic device 10 may be a portable electronic device, such as a model of an iPod® or iPhone®, or a desktop or laptop computer, such as a model of a MacBook®, MacBook® Pro, MacBook Air®, iMac®, Mac® Mini, or Mac Pro®, available from Apple Inc. of Cupertino, Calif. In other embodiments, electronic device 10 may also be a model of an electronic device from another manufacturer that is capable of receiving and processing audio broadcast data. As will be discussed further below, electronic device 10 may be configured to perform one or more low power actions when a low power state is detected which may, in some embodiments, temporarily reduce overall power consumption and prolong battery life.

As shown in FIG. 1, electronic device 10 may include various internal and/or external components which contribute to the function of device 10. Those of ordinary skill in the art will appreciate that the various functional blocks shown in FIG. 1 may comprise hardware elements (including circuitry), software elements (including computer code stored on a computer-readable medium) or a combination of both hardware and software elements. For example, in the presently illustrated embodiment, electronic device 10 may include input/output (I/O) ports 12, input structures 14, one or more processors 16, memory device 18, non-volatile storage device(s) 20, expansion card(s) 22, networking device 24, power source 26, display 28, audio broadcast receiver 30, audio broadcast processing logic 32, and audio output device 34.

I/O ports 12 may include ports configured to connect to a variety of external devices, including audio output device 34. In one embodiment, audio output device 34 may include external headphones or speakers, and I/O ports 12 may include an audio input port configured to couple audio output device 34 to electronic device 10. For instance, I/O ports 12 may include a 2.5 mm port, 3.5 mm port, or 6.35 mm (¼ inch) audio connection port, or a combination of such audio ports. In other embodiments, audio output device 34 may also include speakers integrated with device 10. Additionally, I/O port 12 may include a proprietary port from Apple Inc. that may function to charge power source 26 (which may include one or more replaceable or rechargeable batteries) of device 10, or transfer data between device 10 and an external device. For instance, I/O port 12 may be configured to connect to a suitable electrical outlet to provide power for operating device 10 or to charge power source 26.

Input structures 14 may provide user input or feedback to processor(s) 16. For instance, input structures 14 may be configured to control one or more functions of electronic device 10, such as applications running on electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on device 10. Additionally, input structures 14 may include a touch sensitive mechanism provided in conjunction with display 28. In such embodiments, a user may select or interact with displayed interface elements via the touch sensitive mechanism. As will be discussed further below, input structures 14 may allow a user to configure one or more low power settings on electronic device 10, or respond to prompts provided by electronic device 10 for the selection of a low power action(s) when a low power state is detected.

Processor(s) 16 may include one or more microprocessors, such as one or more "general-purpose" microprocessors, application-specific processors (ASICs), or a combination of such processing components. For example, processor(s) 16 may include instruction set processors (e.g., RISC), graphics/video processors, audio processors, and/or other related chipsets. Processor(s) 16 may provide the processing capability to execute applications on device 10, such as a media player application, and play back digital audio data stored on device 10 (e.g., in storage device 20). In one embodiment, processor(s) 16 may also include one or more digital signal processors (DSPs) for encoding, compressing, and/or encrypting audio broadcast data received via receiver 30.

Instructions or data to be processed by processor(s) 16 may be stored in memory 18, which may be a volatile memory, such as random access memory (RAM), or as a non-volatile memory, such as read-only memory (ROM), or as a combination of RAM and ROM devices. For example, memory 18 may store firmware for electronic device 10, such as an operating system, applications, graphical user interface functions, or any other routines that may be executed on electronic device 10. In addition, memory 18 may be used for buffering or caching data during operation of electronic device 10, such as for caching audio broadcast data received by device 10 prior to encoding and compression by audio broadcast processing logic 32.

The components shown in FIG. 1 may further include non-volatile storage device 20, such as flash memory, a hard drive, or any other optical, magnetic, and/or solid-state storage media, to provide for persistent storage of data and/or instructions. By way of example, non-volatile storage 20 may be used to store data files, including audio data, video data, pictures, as well as any other suitable data. For instance, non-volatile storage 20 may be utilized by device 10 in conjunction with audio broadcast receiver 30 and audio broadcast processing logic 32 for the storage of buffered audio broadcast data.

Electronic device 10 also includes network device 24, which may be a network controller or a network interface card (NIC) that may provide for network connectivity over a wireless 802.11 standard or any other suitable networking standard, such as a local area network (LAN), a wide area network (WAN), such as an Enhanced Data Rates for GSM Evolution (EDGE) network, a 3G data network, or the Internet. In certain embodiments, network device 24 may provide for a connection to an online digital media content provider, such as the iTunes® music service, available from Apple Inc., or may be used to access, stream, or download various media files, including music files, video files, and Internet-based radio broadcasts (commonly referred to as "podcasts").

Display 28 may be used to display various images generated by device 10, such as a GUI for an operating system or for the above-mentioned media player application. Display 28 may be any suitable display such as a liquid crystal display (LCD), plasma display, or an organic light emitting diode (OLED) display, for example. Additionally, display 28 may be provided in conjunction with the above-discussed touch sensitive mechanism (e.g., a touch screen) that may function as part of a control interface for device 10.

As mentioned above, electronic device 10 may include receiver 30, which may be configured to receive live audio broadcast data. For example, in one embodiment, receiver 30 may include one or more antennas configured to receive analog (e.g., AM and FM broadcasts) and digital (e.g., satellite radio or HD Radio®) broadcast signals. In another embodiment, receiver 30 may, in conjunction with network device 24, further be configured to receive digital audio broadcasts transmitted over a network, such as the Internet, though it should be understood that such broadcasts may be on-demand, and may not always constitute live broadcasts, as defined above. Additionally, it should be understood that receiver 30 may include tuning components to enable device 10 to select a desired signal from a particular radio frequency (e.g., corresponding to a particular radio station).

Audio broadcast data received by receiver 30 may be further processed by audio broadcast processing logic 32 for live playback through audio output device 34 which, as discussed above, may include integrated speakers or external headphones or speakers (connected to device through an I/O port 12). Processing logic 32 may also provide for buffering (e.g., encoding, compressing, encrypting, and/or storing) of the received audio broadcast data on device 10 for subsequent playback at a later time. Thus, when device 10 is configured to buffer a particular audio broadcast, a user that has missed the beginning portion of the live broadcast may still hear the broadcast in its entirety by playing back the buffered data. To provide an example, if an audio program is 60 minutes long and begins broadcasting at 2:00 PM, and the user is unable to tune in until 5 minutes into the live broadcast (e.g., at 2:05 PM), the user may still hear the live broadcast in its entirety from the beginning by playing back the buffered data. In this case, processing logic 32 may continue to encode the current live broadcast stream while decoding earlier buffered samples, such that the entirety of the live broadcast is buffered at least partially concurrently with the playback of earlier buffered portions of the live broadcast. Thus, in this particular scenario, the buffered playback and the live broadcast are time-shifted by 5 minutes.

Further, in accordance with the low power management techniques discussed above, audio broadcast processing logic 32 may include logic (e.g., programmed software routines, circuitry, or a combination thereof) configured to implement one or more low power actions upon the detection of a low power state (e.g., when available power falls below a particular threshold). For instance, a low power action may include starting, stopping, and/or continuing one or more device functions relating to the buffering or playback of audio broadcast data. By way of example only, device 10 may be configured to stop buffering and to continue or start playback of an audio broadcast, may be configured to stop playback and continue buffering of the audio broadcast, or may be configured to stop both buffering and playback functions and to output the live audio stream upon detection of a low power state. In other words, power that would have otherwise been used to perform one function may be instead be used to prolong one or more other functions. For instance, in the case where device 10 continues buffering the audio broadcast but stops playback functions, the power that would have been expended for playing back the buffered audio broadcast data may be used instead to perform additional buffering. Thus, in the latter example, more data may be buffered at the expense of sacrificing playback time. In another embodiment, device 10 may also be configured to reduce a compression bit-rate used during the encoding process when a low power state is detected, thus reducing processor load and further lowering power consumption.

Figure 2:
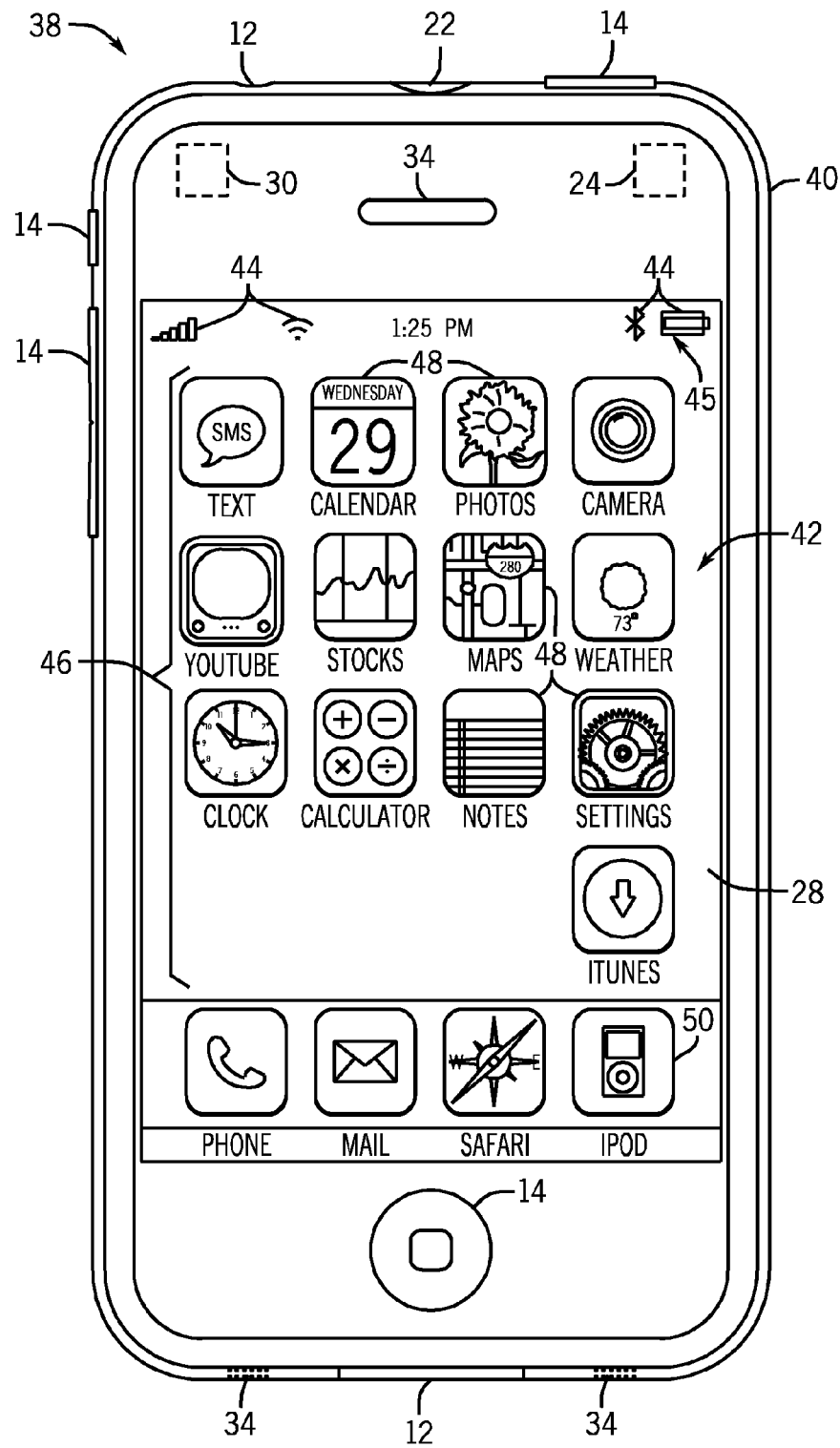
FIG. 2 is a front view of a handheld electronic device, in accordance with aspects of the present disclosure.

Referring now to FIG. 2, electronic device 10 is illustrated in the form of portable handheld electronic device 38, which may be a model of an iPod® or iPhone® available from Apple Inc. In the depicted embodiment, handheld device 38 includes enclosure 40, which may function to protect the interior components from physical damage and to shield them from electromagnetic interference. Enclosure 40 may be formed from any suitable material or combination of materials, such as plastic, metal, or a composite material, and may allow certain frequencies of electromagnetic radiation, such as radio carrier signals or wireless networking signals, to pass through to audio broadcast receiver 30 or to wireless communication circuitry (e.g., network device 24), both of which may be disposed within enclosure 40, as shown in FIG. 2.

Enclosure 40 also includes user input structures 14 through which a user may interface with handheld device 38. For instance, each input structure 14 may be configured to control one or more respective device functions when pressed or actuated. By way of example, one or more of input structures 14 may be configured to invoke a "home" screen 42 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that handheld device 38 may include any number of suitable user input structures existing in various forms including buttons, switches, keys, knobs, scroll wheels, and so forth.

In the illustrated embodiment, handheld device 38 includes display 28 in the form of a liquid crystal display (LCD). LCD 28 may display various images generated by handheld device 38. For example, LCD 28 may display various system indicators 44 providing feedback to a user with regard to one or more states of handheld device 38, such as power state (referred to by reference number 45), signal strength, external device connections, and so forth. LCD 28 may also display graphical user interface ("GUI") 46 that allows a user to interact with handheld device 38. GUI 46 may include various layers, windows, screens, templates, or other graphical elements that may be displayed in all, or a portion, of LCD 28. For instance, as shown on home screen 42, GUI 46 may include graphical elements representing applications and functions of device 38. The graphical elements may include icons 48 that correspond to various applications that may be opened or executed upon detecting a user selection (e.g., via a touch screen included in display 28 or via input structures 14) of a respective icon 48. By way of example, one of the icons 48 may represent media player application 50, which may provide for the playback of digital audio and video data stored on device 38, as well as the playback of live and/or buffered audio broadcast data. In some embodiments, the selection of an icon 48 may lead to a hierarchical navigation process, such that selection of an icon 48 leads to a screen that includes one or more additional icons or other GUI elements.

Figure 3:
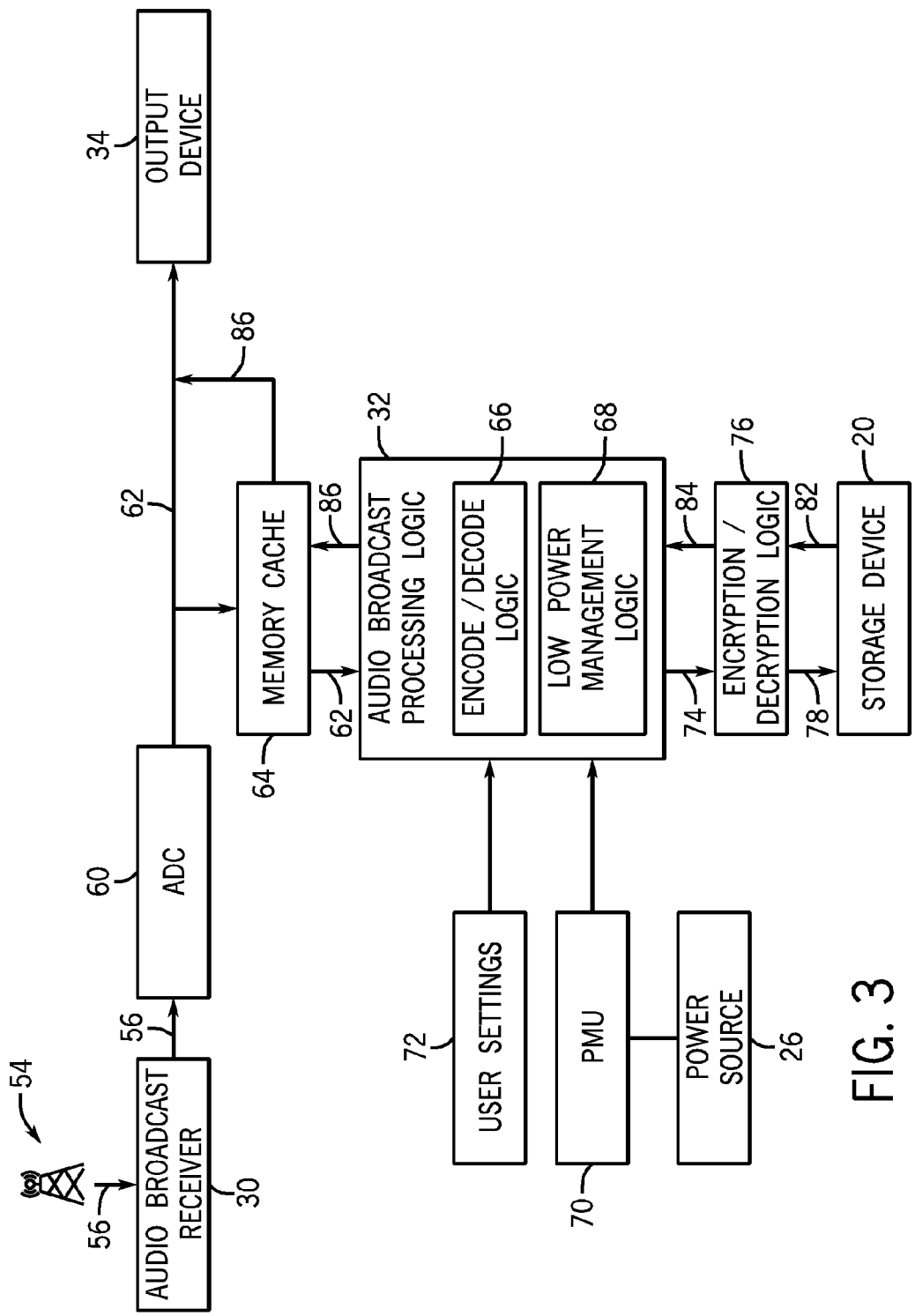
FIG. 3 is a more detailed block diagram showing the processing logic that may be implemented in the electronic device of FIG. 1, in accordance an embodiment of the presently disclosed techniques.

Referring to FIG. 3, a more detailed view of an example of audio broadcast processing logic 32 is illustrated, in accordance with one embodiment. As mentioned above, audio broadcast processing logic 32 may provide for the buffering of a live audio program, the subsequent playback of the buffered audio program, and may implement one or more low power actions relating to such functions depending on whether device 10 is operating in a normal or low power state. As depicted in the present embodiment, audio broadcast processing logic 32 may communicate with receiver 30 that receives audio broadcast signals 56 from broadcasting station 54, which may be a terrestrial radio tower or a satellite. In some embodiments, audio broadcast receiver 30 may also receive a sub-carrier metadata signal associated with audio broadcast 56, which may be utilized by device 10 to enhance the user's listening experience, such as by providing additional information (e.g., visually by displaying the metadata on display 28 or audibly by converting the metadata information into an audio signal using a text-to-speech application) about audio broadcast 56, such as a program name, artist name, broadcasting station information, and so forth. By way of example, broadcast metadata information could be provided via a Radio Data System (RDS) data signal associated with an FM signal, an Amplitude Modulation Signaling System (AMSS) data signal associated with an AM signal, or Program Associated Data (PAD) and Program Service Data (PSD) data signals associated with digital radio signals (e.g., satellite or IBOC broadcasting).

Additionally, processing logic 32 may also provide for live playback of the audio broadcast 56 by routing the broadcast signal to output device 34. It should be understood that the buffering (e.g., encoding, compression, and storage) of the audio broadcast by processing logic 32 may occur independently of live playback through output device 34. For instance, processing logic 32 may encode and store the audio broadcast with or without live playback, and a user may subsequently access the stored audio broadcast for playback at a later time.

As shown in FIG. 3, audio broadcast signal 56 is received by electronic device 10 using receiver 30. Where signal 56 is an analog signal, such as a conventional FM or AM broadcast signal, analog-to-digital converter 60 may be provided for conversion of signal 56 into a digital equivalent signal 62. Alternatively, where the audio broadcast is transmitted digitally from source 54, such as by way of satellite broadcasting or through the use of digital FM or AM broadcasting technologies (e.g., IBOC, HD Radio®), the digital signals may be processed directly by processing logic 32 (e.g., without use of analog-to-digital converter 60). As part of the encoding process shown in FIG. 3, digital audio broadcast data 62 is first buffered in memory cache 64. Memory cache 64 may be a dedicated memory within processing logic 32, or may be part of memory device 18 of electronic device 10. The buffered audio broadcast data 62 is then sent to audio processing logic 32, which may include, encode/decode logic 66 and low power management logic 68. As will be discussed further below, low power management logic 68 may receive data from power management unit (PMU) 70 relating to the available power remaining in power source 26. When low power management logic 68 determines that the available power has fallen below a low power threshold (e.g., 20%), one or more low power actions may be implemented to prolong battery life.

Encode/decode logic 66 may be configured to encode and compress audio broadcast data 62 into a format that may be stored on storage device 20 using an audio codec. By way of example only, encode/decode logic 66 may employ Advanced Audio Coding (AAC or HE-ACC), Apple Lossless Audio Codec (ALAC), Ogg Vorbis, MP3, MP3Pro, MP4, Windows Media Audio, or any suitable music encoding format. In some embodiments, speech codecs, such as Adaptive Multi-Rate (AMR) and Variable Multi-Rate (VMR), may also be utilized by encode/decode logic 66 depending on the type of audio program that is being encoded. As will be appreciated, the codec or codecs utilized by encode/decode logic 66 may be specified through user settings 72 stored on device 10. In some embodiments, user settings 72 may also specify a particular compression bit-rate that maybe used by encode/decode logic 66 in compressing the encoded data. As mentioned above, in some embodiments, encode/decode logic 66 may be configured to lower the compression bit-rate during low power states, which may reduce total processing cycles during the encoding process at the cost of some degree of reduction in the audio quality of the resulting buffered data, but with the benefit of reducing total power consumption and, therefore, prolonging battery life. As discussed above, a digital signal processor (DSP), which may be part of processor(s) 16, may be provided to carry out the encoding/compression functions.

Once broadcast data 62 is encoded and/or compressed, encoded broadcast data, referred to by reference number 74, may be encrypted using encryption/decryption logic 76 prior to being stored on electronic device 10. As can be appreciated, encryption of encoded broadcast data 74 may be applied to prevent circumvention of copyright and other related legal issues. In certain embodiments, encryption/decryption logic 76 may utilize the Advanced Encryption Standard (AES), the Data Encryption Standard (DES), or any other suitable encryption technique. Encryption/decryption logic 76 may be separate from processing logic 32, as shown in FIG. 3, or may also be integrated with processing logic 32 in other embodiments. Encrypted broadcast data 78 may then be stored in non-volatile storage device 20. As discussed above, storage device 20, in some embodiments, may include a flash memory device, such as a NAND flash memory. In such embodiments, one or more wear-leveling techniques may be utilized by the flash memory device, such that erasures and writes are distributed evenly across the flash memory arrays, thereby preventing premature block failures due to a high concentration of writes to one particular area.

In addition to buffering the audio broadcast data 62 in storage 20, processing logic 32 may also provide for the playback of buffered audio data retrieved from storage 20, referred to here by reference number 82, through decryption, decompression, and decoding. For instance, upon selection of buffered audio broadcast data 82 for playback, data 82 is first decrypted by encryption/decryption logic 76. Decrypted data 84 may then be decoded and/or decompressed by encoder/decoder logic 66. Thereafter, the decoded and decompressed data 86 may then be sent to memory cache 68. Though not shown in FIG. 3, those skilled in the art will appreciate that some embodiments may also include digital-to-analog conversion circuitry for converting decoded data 86 back into an analog signal prior to being output to audio output device 34.

As mentioned above, depending on the power state of device 10 (e.g., normal or low power state), one or more low power actions may be implemented to prolong battery life, such as by stopping, starting, and/or continuing certain device functions relating to the buffering and/or playback of audio broadcast data. In accordance with disclosed embodiments, low power management logic 68, upon detection of a low power state, may determine the low power action(s) to implement based upon user settings 72, which may be pre-configured by a user (e.g., configured prior to the low power state), or by presenting a user a list of available low power actions and subsequently performing the action selected by the user. For instance, in one embodiment, low power management logic 68 may disable either buffering or playback functions on device 10 in accordance with user settings 72. In another embodiment, low power management logic 68 may display to the user a listing of selectable low power action options, such as by way of GUI 46. By way of example, the selectable low power actions may include stopping playback functions while continuing buffering, stopping buffering functions while continuing playback, or stopping both playback and buffering functions and outputting the live audio broadcast stream.

Further, in one implementation, low power management logic 68 may calculate, based upon the remaining power available and the power consumed per unit time (e.g., seconds or minutes) by a particular function, the total time a particular function may continue be performed when a low power action is implemented. By way of example only, low power management logic 68 may inform the user that by stopping playback functions, buffering may continue for a certain number of minutes (e.g., 30 minutes) before the battery is completely depleted and needs to be recharged. Thus, it should be understood that while the low power actions discussed herein do not increase the total remaining power available to device 10, they may reduce the rate at which the remaining power is consumed (e.g., by stopping one or more functions), thus extending the amount of time that device 10 may continue to perform one or more other functions, as determined by the selected and/or performed low power action(s). Additionally, it should be appreciated that in some embodiments, additional actions not necessarily related to the playback or buffering of audio broadcast data may also be performed in conjunction with the above-discussed low power options to further reduce power consumption and prolong battery life. By way of example, such additional actions may include reducing a compression bit-rate during the encoding process (as discussed above, lowering a brightness level of display 28, powering off display 28, powering off network device 24, and so forth.

The buffering and playback functions discussed above are further illustrated in FIG. 4, which depicts a graphical timeline showing live audio broadcast 88, buffered audio broadcast data 90, and buffered playback 92 of live broadcast 88 when electronic device 10 is operating in a normal power state. As shown, live broadcast 88 may be a 60 minute audio program that is broadcasted from time t0 to time t60 (e.g., 2:00 PM to 3:00 PM), and device 10 may be configured to start buffering live broadcast 88 beginning at time t0. Thus, assuming that a user is unable to tune in to broadcast 88 until time t5 (e.g., 5 minutes into live broadcast 88), the user may still listen to live broadcast 88 in its entirety by initiating buffered playback 92 at time t5 and playing the buffered data 90.

As buffered playback 92 is occurring, processing logic 32 may continue to encode the current live broadcast stream 88 while decoding an earlier sample of buffered data 90. For instance, between times t5 and t15, the portion of live broadcast 88 received during between times t5 and t15 is buffered (e.g., encoded) while the previously buffered portion of live broadcast 88 from time t0 to t10 is played back (e.g., decoded). Thus, in this scenario, buffered playback 92 and live broadcast 88 are time-shifted by 5 minutes with respect to the original broadcast schedule, such that buffered playback 92 of the entire broadcast 88 occurs from time t5 to time t65 (60 minutes). Again, it should be understood that the presently illustrated examples depicts the operation of device 10 in a normal power state. If a low power state is detected, as will be further illustrated below, one or more low power actions may be implemented which may temporarily stop one or more of the buffering or playback functions.

Figure 4:
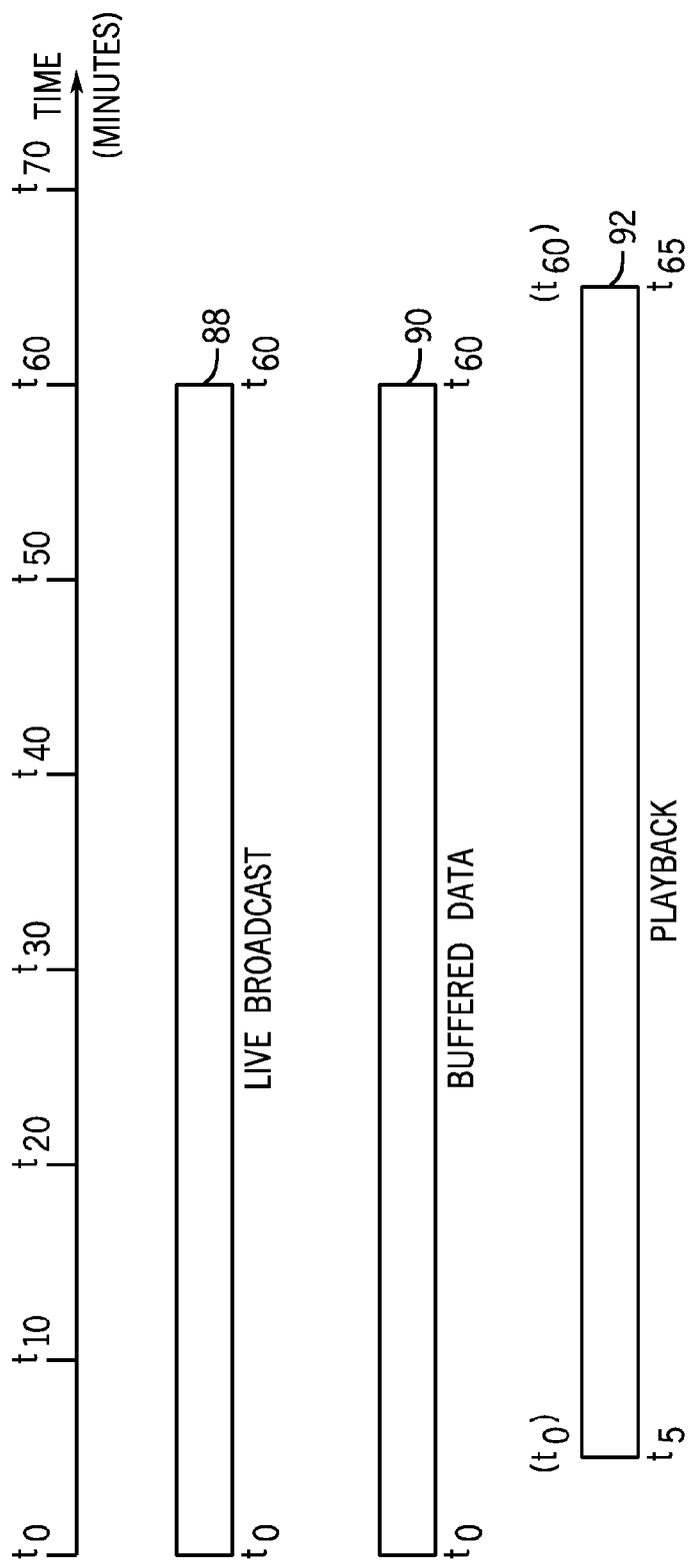
FIG. 4 is a graphical timeline depicting the live broadcast and buffered playback of an audio program when an electronic device is operating in a normal power state.
Figure 5:
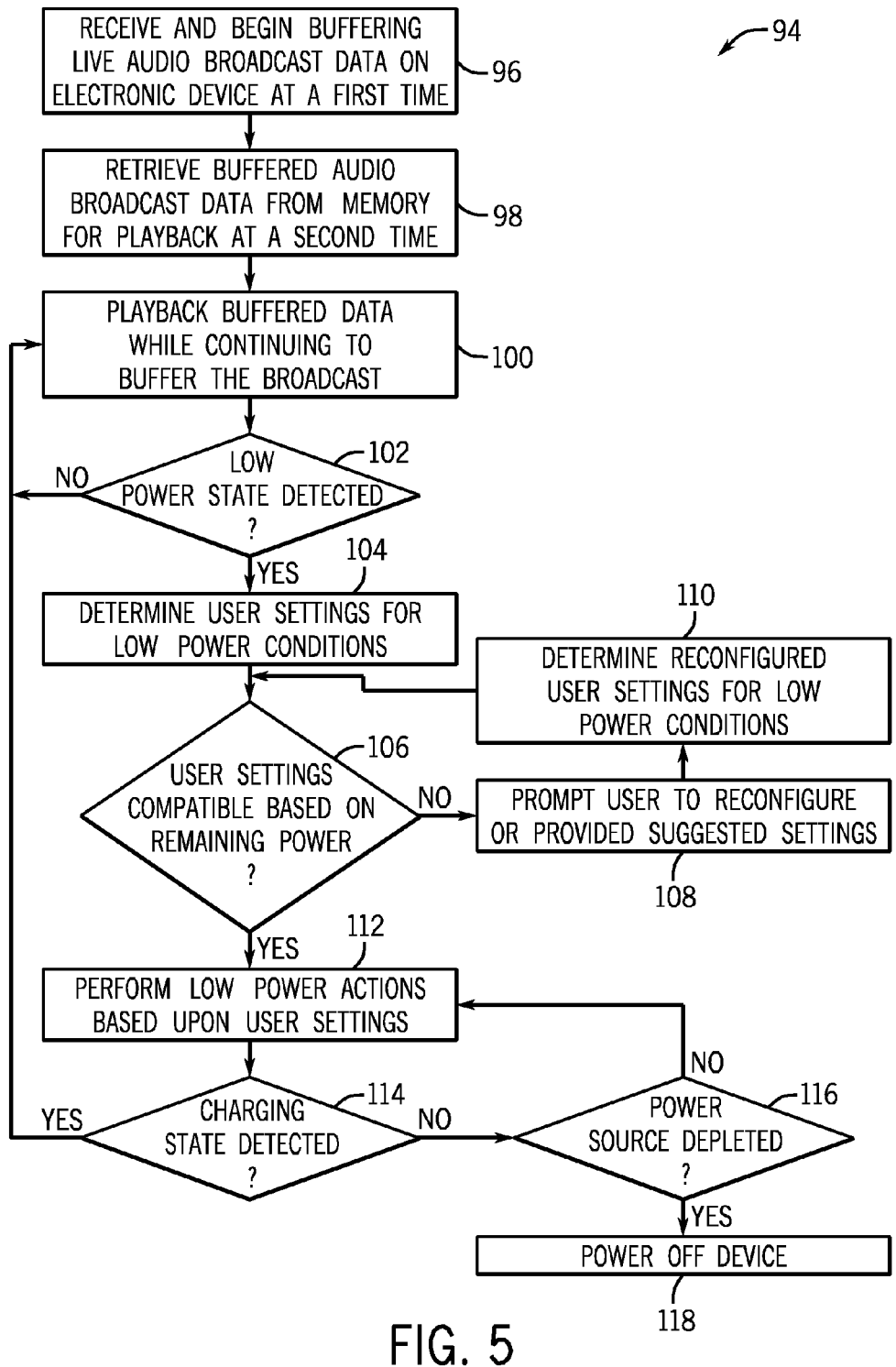
FIG. 5 is a flow chart depicting a process for buffering and/or playing back audio broadcast data on an electronic device based upon one or more low power actions configured by a user of the electronic device, in accordance an embodiment of the presently disclosed techniques.

Continuing now to FIG. 5, a flow chart that depicts a method, referred to by reference number 94, for implementing low power actions based upon one or more user-defined settings, such as user settings 72 (FIG. 3), is illustrated in accordance with an embodiment of the presently disclosed techniques. Method 94, which may be performed by audio broadcast processing logic 32, initially begins at step 96, wherein electronic device 10 begins buffering a live audio broadcast at a first time. For instance, with reference to FIG. 4, electronic device 10, which may receive live broadcast 88 by way of receiver 30, begins buffering live audio broadcast 88 at the start of its scheduled broadcast time t0.

Next, method 94 continues to step 98, which may represent a second time (subsequent to the first time) at which buffered audio data is retrieved from storage device 20 for playback. Thereafter, the retrieved buffered audio data may be played back while device 10 continues to buffer the live broadcast, as indicated by step 100. Method 94 then proceeds to decision block 102, at which it is determined whether device 10 is operating in a low power state. For instance, the logic represented by decision block 102 may be performed by obtaining data from PMU 70 (FIG. 3) relating to the remaining charge left in a battery that powers device 10 and determining whether the remaining available power is above or below a low power threshold, which may be preset by a manufacture and/or configured by a user. If it is determined at decision block 102 that the remaining power is above the low power threshold, i.e., that device 10 is operating in a normal power state, method 94 returns to step 100 and continues the playback and buffering of the live audio broadcast. Returning to decision block 102, if it is determined that the remaining power is below the low power threshold, i.e., that device 10 is operating in a low power state, method 94 then proceeds to step 104, at which audio processing logic 32 determines (e.g., using low power management logic 68) the particular low power settings that have been pre-configured by the user (e.g., prior to the detection of the low power state). As will be appreciated, if the user has not yet configured any low power settings, audio processing logic 32 may implement one or more "default" low power actions, which may be pre-configured by the manufacturer of device 10.

Thereafter, at decision block 106, it is determined whether the user settings identified at step 104 provides a configuration that is compatible with the available remaining power. As will be appreciated, the decision made at block 106 may be based on the particular low power actions specified in the configured settings, as well as the low power threshold. By way of example only, assume that a low power state occurs when the remaining charge in the battery drops to 10%, and that the user settings determined at step 104 indicate that the user wishes to stop playback functions but to continue buffering for 40 additional minutes upon detecting the low power state. If 10% of the total battery capacity is insufficient to buffer 40 additional minutes of audio data, the user may be prompted by device 10 to reconfigure the low power setting to achieve a configuration that can be performed with the available power, as shown at step 108. The reconfigured low power settings are then determined at step 110 and, afterwards, method 94 returns to decision block 106 to determine whether the reconfigured low power settings may be implemented using the remaining power. If it is determined that device 10 is still unable to perform the low power actions specified by the reconfigured low power settings, method 94 may repeat steps 108 and 110 until the user selects a low power setting that device 10 can implement based on the remaining power.

Referring again to decision block 106, if it is determined that the remaining power is sufficient for implementing either the originally configured low power settings or the reconfigured low power settings, method 94 continues to step 112, at which the low power actions are performed by device 10. As discussed above, low power actions may include stopping, starting, and/or continuing one or more functions, such as buffering, playback, or output of the live broadcast stream. Next, at decision block 114, a determination is made as to whether device 10 continues to operate in a low power state or enters a charging state, which shall be understood to mean that the battery powering device 10 is being recharged. For instance, a charging state may occur when device 10 is connected to an external power source, such as an electrical AC power outlet, whereby electrical power supplied from the outlet gradually replenishes the battery's charge.

If a charging state is detected, the low power actions implemented at step 112 may be suspended, and method 94 returns to step 100, whereby device 10 may resume normal power state operations (e.g., resume buffering concurrently with playback). If a charging state is not detected at decision block 114, method 94 may instead continue to decision block 116, at which it is determined whether the battery charge is depleted to the point that there is insufficient power to perform any device functions without recharging or providing an alternate power source. For instance, as shown at decision block 116, if the total charge left in the battery is greater than 0%, method 94 continues to perform the low power actions at step 112. However, if the battery is completely depleted, then decision block 116 may proceed to step 118, whereby device 10 is powered off.

Figure 6:
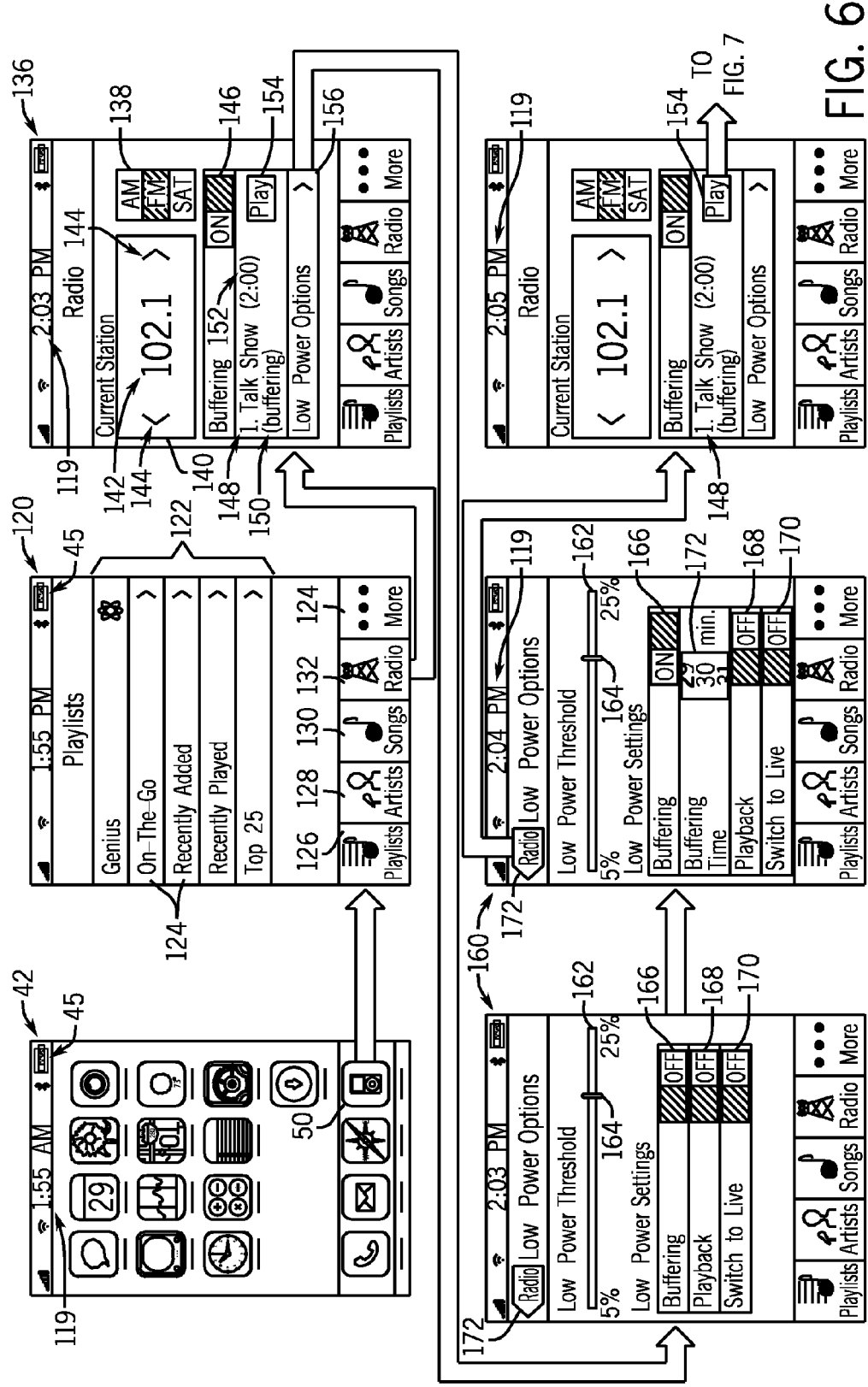
FIG. 6 shows a plurality of screens that may be displayed on the electronic device of FIG. 2 illustrating various low power actions that may be configured by a user relating to the buffering and playback of audio broadcast data when the electronic device is in a low power state, in accordance with aspects of the present disclosure.
Figure 7:
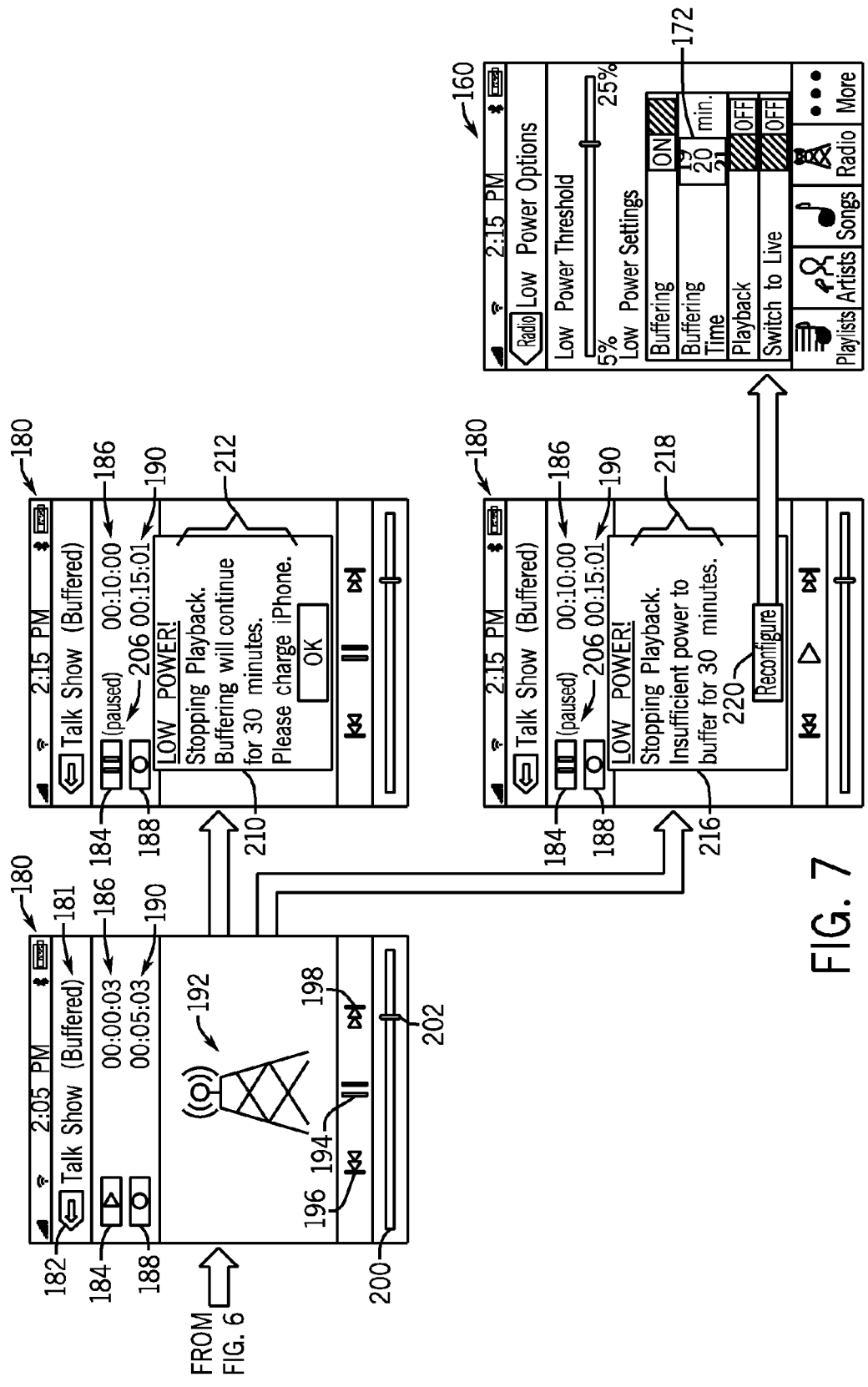
FIG. 7 shows a plurality of screens that may be displayed on the electronic device of FIG. 2 illustrating notifications that may be displayed on the electronic device when, based upon the user configuration shown in FIG. 6, a low power state is detected and one or more low power actions are performed, in accordance with aspects of the present disclosure.

Referring next to FIGS. 6 and 7, the techniques described with reference to method 94 of FIG. 5 is further depicted by way of screen images displayable on portable electronic device 38 (FIG. 2) and representing an exemplary user interface technique for configuring low power settings relating to the buffered playback of audio broadcast data and the implementation of low power actions upon detection of a low power state, in accordance with aspects of the present disclosure. As will be understood, the screen images shown in FIGS. 6 and 7, as well as the screen images that will be subsequently described with respect to FIGS. 10 and 11 below, may be generated by GUI 46 and displayed on display 28 of portable electronic device 38. For instance, these screen images may be generated as the user interacts with the device 38, such as via the input structures 14, or by a touch screen interface.

Additionally, it should be understood that GUI 46, depending on the inputs and selections made by a user, may display various screens including icons (e.g., 48) and graphical elements. These elements may represent graphical and virtual elements or "buttons" which may be selected by the user from display 28. Accordingly, it should be understood that the term "button," "virtual button," "graphical button," "graphical elements," "graphical switches," or the like, as used in the following description of screen images below, is meant to refer to the graphical representations of buttons or icons represented by the graphical elements provided on display 28. Further, it should also be understood that the functionalities set forth and described in the subsequent figures may be achieved using a wide variety graphical elements and visual schemes. Therefore, the illustrated embodiments are not intended to be limited to the precise user interface conventions depicted herein. Indeed, additional embodiments may include a wide variety of suitable user interface styles.

As initially shown in FIG. 6, beginning from home screen 42 of GUI 46, a user may initiate the media player application by selecting graphical button 50. By way of example, the media player application may be an iTunes® or iPod® application running on a model of an iPod Touch® or an iPhone®, available from Apple Inc. The selection of graphical button 50, which may occur at 1:55 PM, as indicated by a displayed clock 119, may cause the user to be advanced to screen 120 of the media player application, which may initially display listing 122 showing various playlists 124 stored on device 38. Screen 120 also includes graphical buttons 126, 128, 130, 132, and 134, each of which may correspond to specific functions. For example, if the user navigates away from screen 120, the selection of graphical button 126 may return the user to screen 120. Graphical button 128 may organize and display media files stored on device 38 by artist name, whereas graphical button 130 may sort and display media files stored on the device 38 alphabetically. Additionally, graphical button 132 may represent a radio tuner application configured to provide for the receiving and buffering of radio broadcast signals. Finally, graphical button 134 may provide the user with a listing of additional options that may be configured to further customize the functionality of device 38 and/or media player application 50. As will be appreciated, the times shown by clock 119 are merely to provide a context for sequential sets of actions (e.g., configuring low power settings, initiating buffered playback, detecting a low power state, etc.), and are not intended to limit the disclosed techniques in any way. Further, it should be noted that battery status indicator 45 shows that the battery is currently charged at less than full capacity.

Next, the selection of graphical button 132 at 2:03 PM may advance the user to screen 136, which displays a radio application. Screen 136 may include graphical element 138, which may allow the user to select a particular broadcast source, such as AM, FM, or even satellite-based broadcasting. Screen 136 further includes virtual display element 140, which may display a current radio station 142 and tuning elements 144. By manipulating tuning elements 144, a user may change the current station 142 from which device 38 receives a broadcast signal. Screen 136 may also provide for the configuration of various user settings 72. For instance, the buffering of audio broadcast data may be enabled via graphical switch 146, which is currently in the "ON" position. Screen 136 may also display a listing of buffered programs. For instance, the presently displayed screen 136 shows that an audio broadcast program entitled "Talk Show," referred to by reference number 148, is currently being buffered, as indicated by status label 150, and that the buffering of program 148 began at 2:00 PM, as indicated by reference number 152. Thus, it should be understood that prior to having initiated media player application 50 from home screen 42 at 1:55 PM, the user may have already configured device 38 to begin buffering "Talk Show" at 2:00 PM. Screen 160 further includes graphical button 154, which may be selected by the user to initiate playback of the buffered "Talk Show" program. Additionally, screen 136 includes menu option 156, which may navigate the user to another screen for the configuration of various low power settings (screen 160).

Referring to screen 160, various low power settings may be configured by the user. For example, screen 160 may include graphical scale 162, which may be manipulated by a user to adjust a low power threshold percentage. The user may position graphical element 164 along scale 162 to an appropriate position corresponding to a desired low power threshold. In the present embodiment, the low power threshold may be increased by sliding the graphical element 164 to the right side of scale 162, and may be decreased by sliding the graphical element 164 to the left side of scale 162. In the presently illustrated configuration, the user has selected a low power threshold of approximately 20%.

Screen 160 further includes additional options by which the user may define low power actions to be implemented by device 38 once the configured low power threshold of 20% is reached. For example, graphical switches 166, 168, and 170, which are all presently in the "OFF" position at 2:03 PM, may be toggled to an "ON" position to define low power settings relating to buffering functions, playback functions, and switching audio output to the live broadcast stream, respectively. Referring to screen 160 at 2:04 PM, the user has toggled graphical switch 166 to the "ON" position while leaving graphical switches 168 and 170 in their initial "OFF" positions. As shown, by toggling graphical switch 166 to the "ON" position, graphical reel 172 may appear on screen 160 and allow the user to specify an amount of time to continue buffering functions when a low power state is detected. Thus, based on the present user-selected settings, when the battery charge decreases to 20%, device 38 may stop playback functions and continue to buffer the live audio broadcast for 30 minutes.

Before continuing, it should be understood that different low power configurations are also possible by way of the options displayed on screen 160. For instance, the user may wish to continue playback (switch 168) but to stop buffering during a low power state, or to switch to the live broadcast (switch 170) while stopping both buffering and playback functions. Once the desired settings have been selected, the user may select graphical button 172 to return to screen 136. As shown in the final screen 136 of FIG. 6, the user may select graphical button 154 at 2:05 PM, to initiate buffered playback of the audio broadcast program 148, which may further navigate the user to screen 180, as shown in FIG. 7.

Screen 180 displays the title of the buffered audio program ("Talk Show"), and status label 181 may further indicate that the playback is of an earlier buffered portion of the program (e.g., occurring prior to the current time of 2:05 PM), as opposed to being a live stream. In the present embodiment, screen 180 may display playback indicator 184 and playback timer 186, as well as buffering indicator 188 and buffering timer 190. Playback times 186 may display the time that has elapsed since playback from the beginning of the buffered audio program. For instance, just after initiating playback at 2:05 PM, 3 seconds of buffered audio data have been played back. Additionally, with regard to the buffering function, which may continue concurrently with the playback function, buffering timer 190 shows that 5 minutes and 3 seconds of audio data have been buffered since the beginning of the broadcast at 2:00 PM.

Screen 180 may additionally display one or more images 192, which vary depending on the media being played back on device 38. For instance, where digital media in the form of a music album is being played, a picture of the album cover may be displayed as image 192. Here, because the current playback is of buffered audio broadcast data, a generic image 192 of a broadcast tower is shown. It should be appreciated, however, that the user may configure device 38 to display any suitable image (or even no image), including photos stored on device 38, on screen 180. Screen 180 may further include the graphical buttons 194, 196, and 198. As will be appreciated, graphical button 194 may allow the user to toggle the playback of a media file (e.g., in this case, the buffered audio broadcast data), between a play and pause state. Further, where the presently played media file is part of a playlist, graphical buttons 196 and 198 may represent functions for returning to the previous file in the playlist or continuing to the subsequent file in the playlist. In some embodiments, graphical buttons 196 and 198 may also select a random media file for playback, such as when media player application 50 is operating in a random or shuffled playback mode. Additionally, screen 180 may include graphical scale 200 and element 202, which may provide for volume adjustment functions. For instance, a user may increase the audio output volume of device 38 by positioning element 202 towards right of scale 200, and decrease the audio output volume by positioning element 202 towards the left of scale 200.

Referring still to FIG. 7, playback of the buffered "Talk Show" program 148 may continue until 2:15 PM, at which point a low power state is detected. Based on the configuration steps depicted in screen 160 of FIG. 6, this would mean that at 2:15 PM, audio processing logic 32 determines that the remaining charge in the battery has dropped to 20% of its total charge capacity. Thus, as indicated by pop-up window 210, device 38 may implement one or more low power actions, as specified by the user configuration settings shown in FIG. 6. For instance, notification message 212 may indicate that playback functions have stopped (as shown by status label 206 next to playback indicator 184), and that buffering will continue for 30 minutes, as previously specified on screen 160 of FIG. 6. Message 212 may also advise the user to begin recharging the battery which, as discussed, may allow device 38 to exit low power mode and resume normal power state operations.

As discussed above in FIG. 4 with reference to steps 106-110, audio processing logic 32 may, prior to implementing the low power actions, determine if there is sufficient power to apply the pre-configured low power settings. For instance, assuming that a remaining charge of 20% is insufficient to buffer 30 more minutes of audio broadcast data, device 38 may instead display pop-up window 216. As shown, pop-up window 216 may display notification message 218 informing the user that there is insufficient power to perform the presently configured low power actions. Pop-window 216 may also include graphical button 220 which, upon being selected, may return the user to screen 160 for reconfiguring the low power settings. For instance, as shown in FIG. 7, the user may attempt to reduce the buffering time from 30 minutes to 20 minutes using graphical reel 172 in order to decrease the total power required for performing the reconfigured low power actions to a level that is compatible with the available power. Again, it should be noted that the particular configuration steps depicted in the screen images of FIGS. 6 and 7 are merely intended to be an example of one possible user configuration defining low power actions. Indeed, various alternate low power configurations are possible depending on the selections made by the user (e.g., in screen 160).

Figure 8:
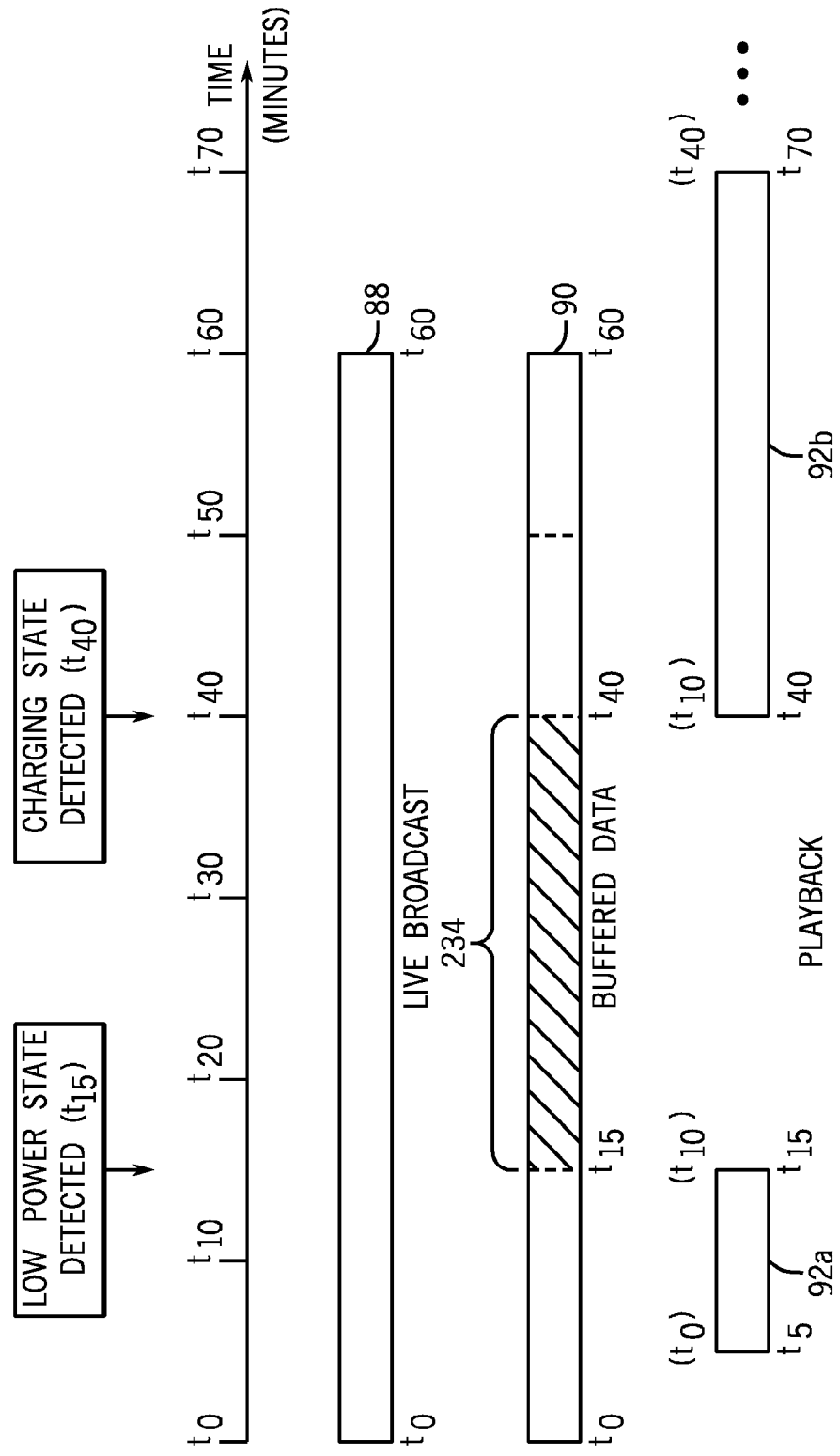
FIG. 8 is a graphical timeline depicting a live broadcast of an audio program, as well as the buffering and playback of the live broadcast based upon the user configuration illustrated in FIG. 6, in accordance with aspects of the present disclosure.

Continuing to FIG. 8, a graphical timeline depicting the same live broadcast 88 from FIG. 4, but showing the implementation of the low power settings configured in FIGS. 6 and 7 upon the detection of a low power state is illustrated. For the purposes of describing the present figure based on the embodiment shown in FIGS. 6 and 7, the minutes from t0 to t60 may be understood to correspond to each respective minute in the hour beginning from 2:00 PM and ending at 3:00 PM. Thus, assuming again that the user initiates buffered playback at time t5, device 10 may start playback 92a of the buffered data 90 corresponding to the beginning of the live broadcast 88 (e.g., corresponding to time t0) at time t5.

At time t15 (2:15 PM) a low power state may be detected. For instance, this may indicate that the total charge left in the battery of device 10 has reached 20% of its total capacity. Accordingly, the user-configured low power actions are implemented at time t15. For instance, with reference to screen 160 of FIGS. 6 and 7, playback functions may stop, and buffering may continue for 30 more minutes (until time t50), provided that device 10 remains in a low power state. Thus, at time t15, the user has only heard the playback of the first 10 minutes (time t0 to t10) of the buffered data, as indicated by reference number 92a. Assuming that device 10 remains in the low power state until time t50, buffering may end at time t50 and device 10 may enter a standby mode and await additional inputs from the user. In another embodiment, if device 10 determines that there is still sufficient power to continue performing the selected low power action(s) (e.g., in this case—buffering) at time t50, device 10 may continue to buffer live broadcast 88 even beyond the user-specified buffering time of 30 minutes.

In the present example, it should be noted that a charging state is detected at time t40. As discussed above, a charging state may occur if the battery enters a recharging operation, such as by connecting device 10 to an AC wall outlet. Accordingly, normal power state operations may resume at time t40. For instance, as shown in the graphical timeline of FIG. 8, buffering of the live broadcast 88 may continue while playback resumes at time t40, as indicated by reference number 92b. It should be understood that because the charging state was detected prior to time t50, buffering functions performed as a direct result of implementing the user-configured low power actions occurred only from time t15 to time t40, as indicated by interval 234. In other words, beginning at time t40, device 10 exits the low power state and resumes operating in a normal power state.

Additionally, it should also be noted that when playback 92b begins at time t40, it will resume from the point at which playback 92a previously ended at time t15, such that playback 92b begins with audio data that was originally buffered at time t10. Thus, based on the present example, playback 92b of the remaining 50 minutes (from time t10 to t60) of live broadcast 88 will occur from time t40 to t90 (not shown), provided that device 10 remains in a normal power state during this time.

As will be appreciated, the amount by which battery life may be prolonged using the presently described techniques may depend upon the particular low power action or combination of low power actions selected by the user. For instance, while the exact rates of power consumption may vary from implementation to implementation, due to the nature of audio encoding, the buffering process generally consumes more power relative to the playback (decoding) of buffered data, and buffering and playback each generally consumes more power than simply outputting live broadcast data. Thus, in some embodiments, the prolongment of battery life may generally be maximized during low power states by stopping both buffering and playback functions while outputting live broadcast data. For instance, referring back to FIGS. 6 and 7, the latter configuration may be achieved by toggling graphical switch 170 of screen 160 to the "ON" position and by toggling graphical switch 166 back to the "OFF" position. In this scenario, assuming all of the live broadcast data 88 prior to the detection of the low power state at time t15 has been buffered by device 10, the user, at time t15, will have heard only the first 10 minutes of live broadcast 88 (time t0 to t10). Then, assuming that a charging state is not detected at time t40, device 10 may then output the live broadcast 88 in real-time from time t15 to time t60. Once live broadcast 88 has concluded (at time t60), the user may return to the buffered data and listen to the portion of live broadcast 88 from time t10 to t15 that was missed due to switching from the buffered playback to the live stream. In this manner, the user may still be able to listen to the entirety of live broadcast 88 while further increasing the time by which battery life of device 10 is prolonged.

In another embodiment of the present technique, which will be described in greater detail below with respect to FIGS. 9-14, device 10 may, upon detecting a low power state, determine one or more possible low power actions (or a combination of such actions) based upon the remaining power available, prompt a user to select one of the possible low power action(s), and perform the low power action selected by the user. In other words, rather than automatically implementing a particular low power action based upon pre-configured user settings, as discussed with regard to the embodiments shown in FIGS. 5-8, device 10 may display a listing of several available low power actions that may be implemented upon detecting a low power state and perform one of these low power actions after receiving a selection input from the user.

Figure 9:
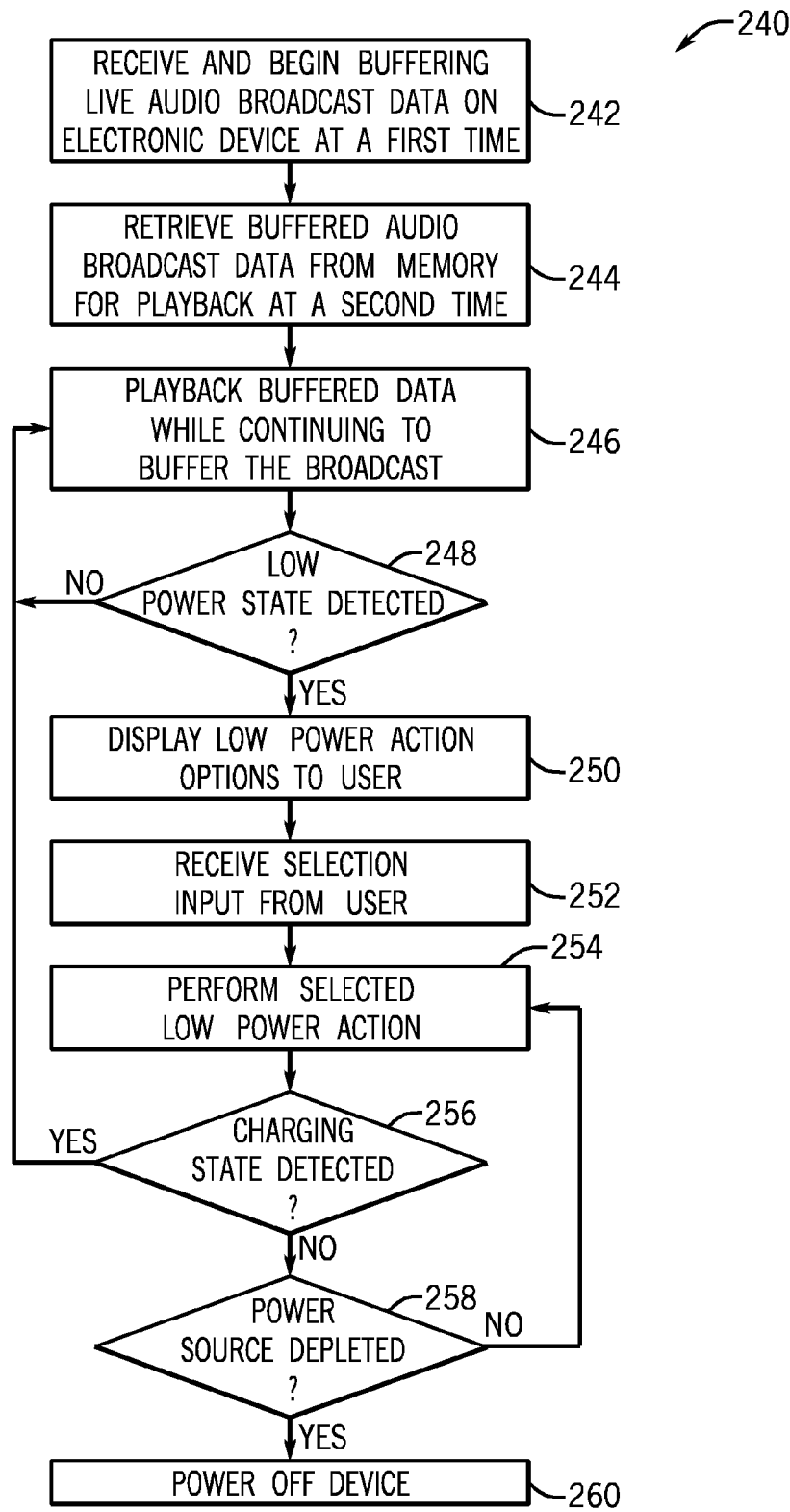
FIG. 9 is a flow chart depicting a process for prompting a user for the selection of one or more low power actions relating to the buffering and playback of audio broadcast data on an electronic device when a low power state is detected, and for performing the selected low power action(s), in accordance with a further embodiment of the presently disclosed techniques.

With the foregoing points in mind, method 240 of FIG. 9 illustrates such a process by way of a flow chart. The initial steps 242, 244, and 246 relate to the initiation of buffering and playback functions on device 10. It should be understood that these steps are generally identical to steps 96, 98, and 100, respectively, of method 94, as described above in FIG. 4. Following step 246, method 240 proceeds to decision block 248 for the determination of whether device 10 is operating in a low power state. If device 10 is not in a low power state, method 240 returns to step 246 and continues the playback and buffering operations in a normal power state.

If it is determined at decision block 248 that device 10 is in a low power state, method 240 continues to step 250, and device 10 may display a listing of selectable low power actions that may be implemented during the low power state. For instance, the listing of selectable low power actions may include: (1) an option to stop playback functions while continuing to buffer; (2) an option to stop buffering functions while continuing playback; and (3) an option to stop both playback and buffering functions and to switch audio output to the live broadcast stream. In one embodiment, the listing of selectable low power actions may be generated by GUI 46 and displayed on display 28 of device 10. Next, at step 252, device 10 may receive an input from the user that indicates the user's selection of one of the listed low power actions. For example, the user input may be provided by way of one of input structures 14 or through user interaction with a touch screen of display 28. Thereafter, the selected low power action, as determined by the user selection input, is performed by device 10, as indicated by step 254.

Following step 254, device 10 may continue to perform the selected low power action until it is determined that device 10 is no longer in a low power state. For instance, at subsequent decision block 256, method 240 may determine whether device 10 has entered a charging state. As discussed above, detection of a charging state may allow device 10 to resume operating under normal power state conditions. For instance, if a charging state is detected at decision block 256, method 240 returns to step 246 and resumes the playback and buffering functions being performed prior to the detection of the low power state. If a charging state is not detected, then method 240 continues to decision block 258 and continues to monitor the remaining power available to device 10. If the power source (e.g., battery) is still capable of providing enough power to continue performing the selected low power action, then method 240 returns to step 254. However, if the power source becomes depleted to the point that device 10 can no longer perform the selected low power action, device 10 may be powered off at step 260. In some embodiments, a minimal amount of charge may remain in the power source and may be utilized to display a notification message requesting that the user recharge the power source, or provide an alternate source of power (e.g., external power from an AC wall outlet).

Figure 10:
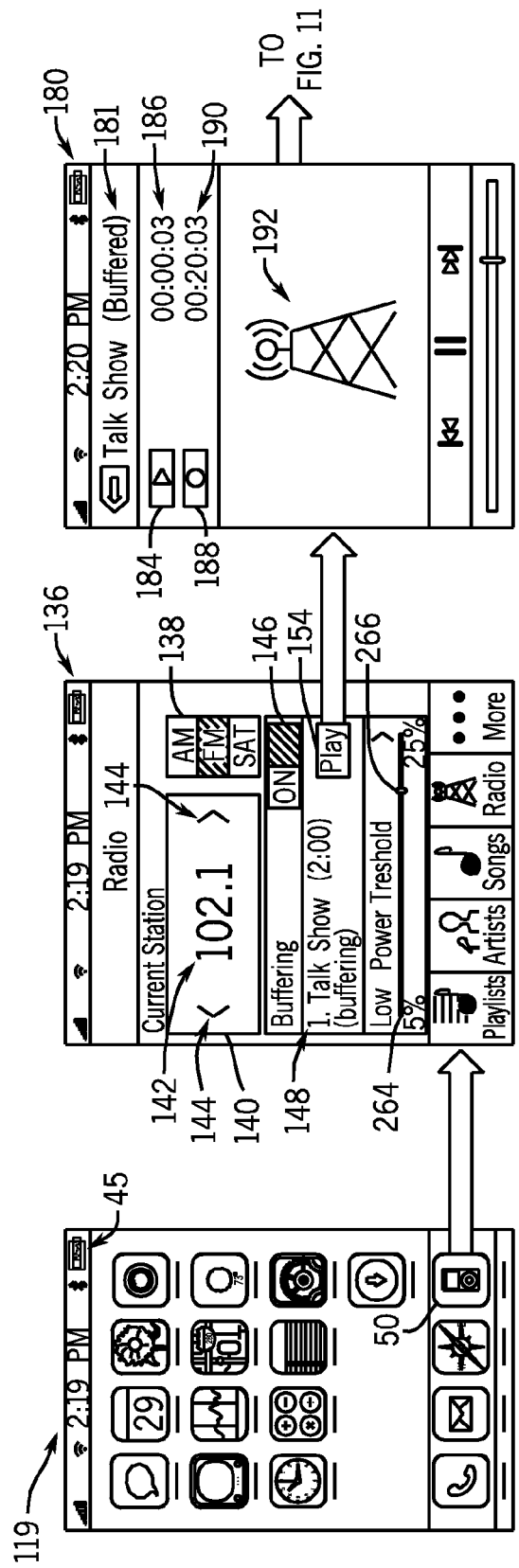
FIGS. 10 and 11 show a plurality of screens illustrating a plurality of selectable low power actions that may be displayed by the electronic device of FIG. 2 when a low power state is detected, in accordance with aspects of the present disclosure.
Figure 11:
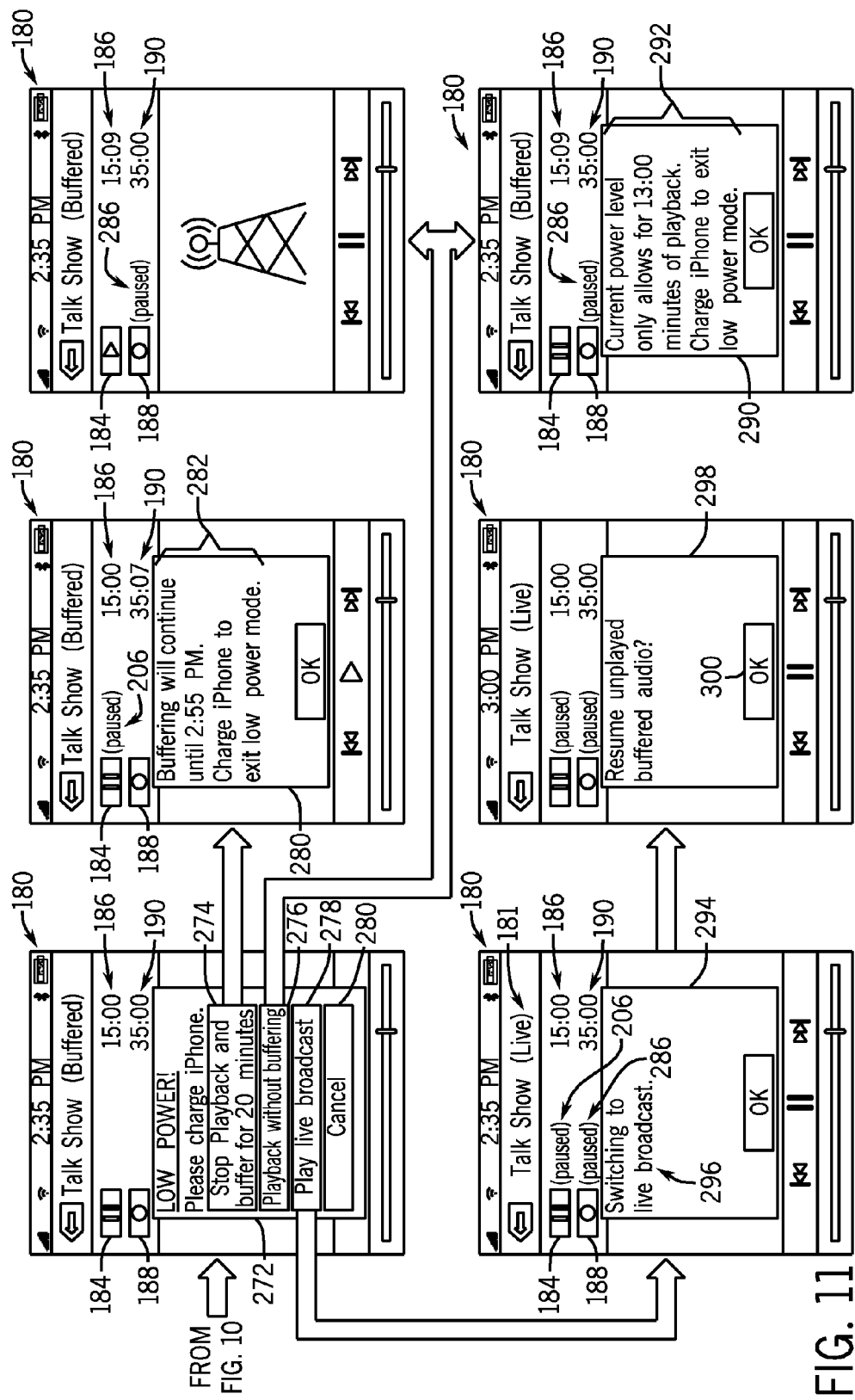

Referring now to FIGS. 10 and 11, screen images that may be displayed on portable electronic device 38 (FIG. 2) further illustrating the process 240 of FIG. 9 is provided, in accordance with aspects of the present disclosure. It should generally be understood that certain graphical elements of FIGS. 10 and 11 which have already been described above with reference to the screen images shown in FIGS. 6 and 7 are identified with the same reference numbers.

Referring first to FIG. 10, a user may access media player application 50 by selecting the corresponding graphical icon from home screen 42 at 2:19 PM, as shown by clock 119. For the purposes of the present description and with reference to the examples shown above in FIGS. 6 and 7, it should be assumed the device 38 of FIG. 10 is also configured to begin buffering a particular audio broadcast ("Talk Show") beginning at 2:00 PM. Thus, in the present embodiment, it should be understood that 19 minutes of the audio broadcast program have already been buffered when media player application 50 is initiated at 2:19 PM in FIG. 10.

After initiating media player application 50, the user may be navigated to screen 136, which displays the radio application, as discussed above, and indicates that audio broadcast program 148, "Talk Show," is currently being buffered. Overall, the illustrated screen 136 of FIG. 10 is generally similar to screen 136 of FIG. 6, but lacks a menu selection item (e.g., 156) for accessing screen 160 for configuration of low power settings. As explained above, this is generally because the presently illustrated embodiment (e.g., process 240 of FIG. 9) does not require low power settings to be pre-configured by the user (e.g., prior to detection of a low power state). Rather, the present embodiment presents the user with a listing of selectable low power actions upon detection of a low power state. To the extent that some degree of configurability is provided, screen 136 of the presently illustrated embodiment provides a graphical scale 264 and element 266 which may be manipulated by the user to adjust the low power threshold value, currently set to approximately 20%. To begin playback of the buffered "Talk Show" program 148, the user may select graphical button 154.

Subsequent screen 180 illustrates the playback of the buffered "Talk Show" program 148 just shortly after the selection of graphical button 154 at 2:20 PM. For instance, playback timer 186 indicates that 3 seconds of buffered audio data have been played back since initiating buffered playback at 2:20 PM. Additionally, with regard to the buffering function, which may continue concurrently with the start of the playback function, buffering timer shows that 20 minutes and 3 seconds of audio data have been buffered since the beginning of the broadcast at 2:00 PM. Accordingly, device 38 may continue to buffer the "Talk Show" program 148 while concurrently playing back earlier buffered samples of program 148 until a low power state is detected.

Continuing to FIG. 11, a low power state is detected at 2:35 PM, 15 minutes after buffered playback was initiated at 2:20 PM in FIG. 10. As shown, upon detection of a low power state, pop-up notification window 272 may be displayed on screen 180. Window 272 may include graphical buttons 274, 276, and 278, which may represent the above-mentioned listing of low power actions that are displayed to the user for selection. For example, selection of graphical button 274 may stop the playback function while continuing to buffer program 148, selection of graphical button 276 may stop the buffering function while continuing playback of data already buffered, and graphical button 278 may switch the audio output to the live broadcast stream, thus stopping both buffering and playback functions. Additionally, window 272 may provide graphical button 280, which may be selected if the user does not wish to implement any low power actions. For instance, if graphical button 280 is selected, device 38 will continue the buffering and playback functions (e.g., normal power state operations) from prior to the detection of the low power state until the power source (e.g., battery) is depleted or until some subsequent user input is detected that stops these functions.

In some embodiments, device 38 may also be configured to provide an approximate calculation regarding the amount of buffering time that is available based upon the power state of device 38. As will be appreciated, this calculation may be determined as a function of the power consumption rate per unit of time (e.g., in minute) for buffering and the total power still remaining. As shown in the present example, graphical button 274 indicates that if buffering is selected as the low power action, 20 minutes of buffering may be performed before the power source (assumed to be currently at 20%) is depleted. This value may change, however, depending on the power state of the device. By way of example only, in one embodiment, if the low power threshold is set to 10%, 15%, or 25%, 4 minutes, 12 minutes, and 33 minutes, respectively, of buffering may be performed. Accordingly, when graphical button 274 is selected by the user as the low power action, screen 180 may be updated to display notification window 280, which includes notification message 282 indicating to the user that buffering will continue for 20 minutes until 2:55 PM. Message 282 also indicates that device 38 may resume operating in a normal power state by charging the power source.

Additionally, because playback functions are stopped when graphical button 274 is selected, status label 206 may appear next to playback indicator 184 to indicate the playback is in a paused or stopped state, and buffering timer 190 may continue to count forward while playback timer 186 stops counting. In a further embodiment, device 38 may be configured to have a maximum buffering time, such that once the maximum time is reached, no more buffering may be performed until at least a portion of the buffer is cleared (e.g., either by deleting some or all of the buffered data). By way of example only, device 38 may include a buffer having a 60 minute limit. Thus, regardless of whether device 38 is operating in a normal or low power state, once the 60 minute limit is reached, buffering is disabled. As will be appreciated, establishing such limits may be useful in embodiments where device 38 has a relatively small and limited amount of data storage space.

Referring back to window 272, if the user decides to select graphical button 276, device 38 stops buffering the live broadcast and continues playback of the buffered data. For instance, status label 286 may be displayed next to buffering indicator 188 to reflect that buffering functions are currently stopped or paused. Similarly, playback timer 186 continues to count forward while buffering timer 190 stops counting. As will be appreciated, at the time (2:35 PM) the low power state was detected, 35 minutes of the audio broadcast has been buffered, and the first 15 minutes of the buffered data has been played back. As such, the remaining buffered data available for playback is the 20 minutes of buffered audio data originally broadcasted from 2:15 PM to 2:35 PM.

In some embodiments, device 38 may determine the remaining buffered playback time and determine whether the remaining power is sufficient to playback the remainder of the buffer. If the remaining power is insufficient for playing back the remainder of the buffer (e.g., 20 minutes), device 38 may determine the portion of the buffered that may be played with the remaining power and inform the user. In the latter scenario, pop-up notification window 290 may be displayed on screen 180 and may include notification message 292, which informs the user that while the entire 20 minutes of the remaining buffered audio data cannot be played with the current available power, a portion of the buffered data equivalent to approximately 13 minutes may be played.

Referring again to window 272, if the user decides to select graphical button 278, device 38 may stop both buffering and playback functions and output the live broadcast as it is received by receiver 30. By way of example, when the selection of graphical button 278 is detected, screen 180 may be updated to display pop-up window 294, which notifies the user by way of message 296 that the audio output is switching from buffered playback to outputting the live broadcast. Additionally, updated screen 280 with window 294 may also display status labels 206 and 286 to indicate that buffering and playback, respectively, are in a stopped, and may further update status label 181 to indicate that the "Talk Show" program 148 is now being played live, rather than from the buffered data. If, following the completion of the live broadcast at 3:00 PM, there remains sufficient power to perform additional functions, pop-up window 298 may appear on screen 180 and inquire whether the user wishes to resume playback of any unplayed buffered data. For instance, in the present example, the unplayed buffered data may include the 20 minute portion of the live broadcast from between 2:15 PM and 2:35 PM. Accordingly, the user may choose to resume playback of the unplayed buffered data by selecting graphical button 300.

Figure 12:
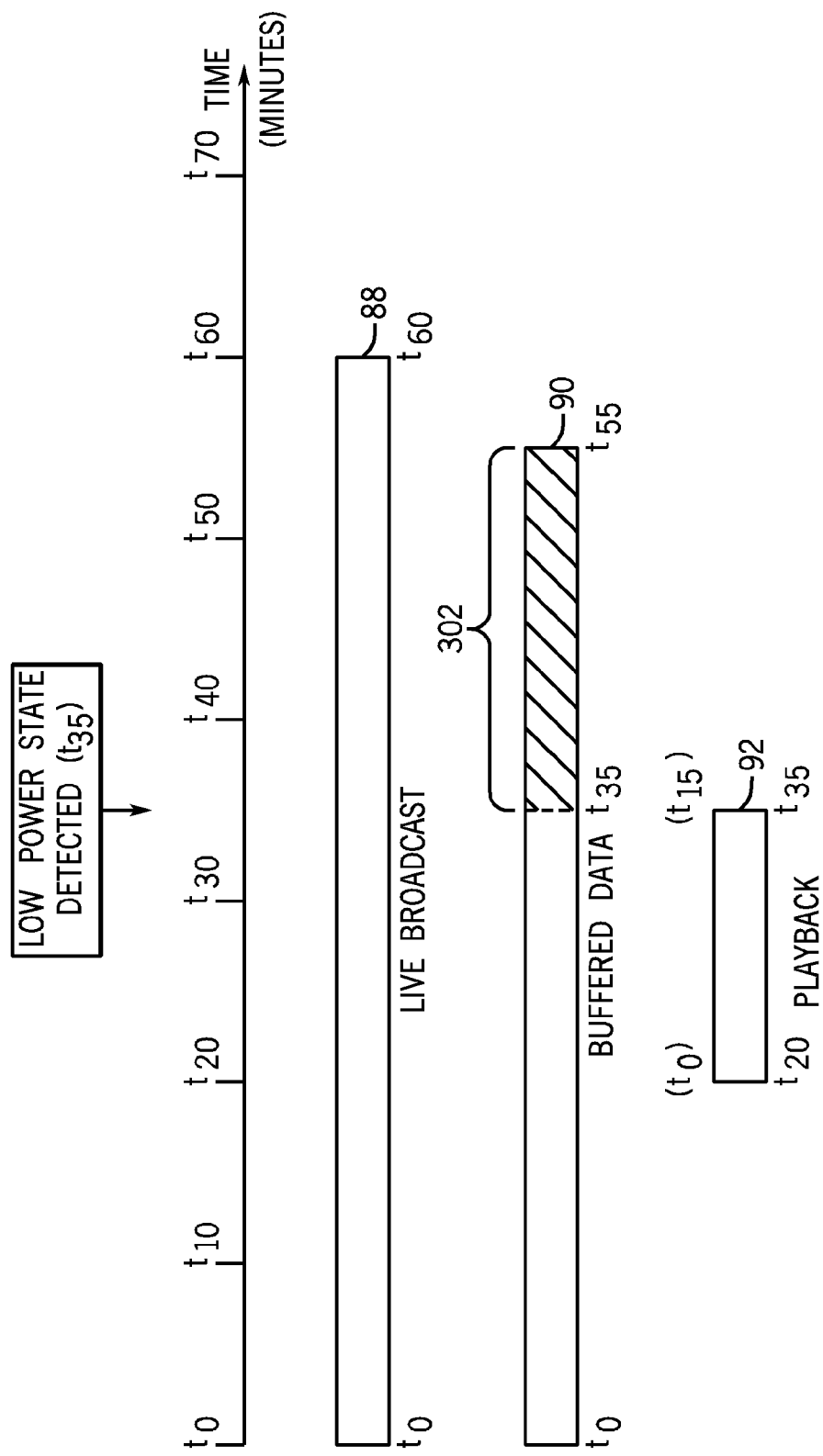
FIGS. 12-14 are graphical timelines depicting the live broadcast of an audio program, as well as the buffering and playback of the live broadcast based upon the selection of a low power action by a user, as illustrated in FIGS. 10 and 11, in accordance with aspects of the present disclosure.
Figure 13:
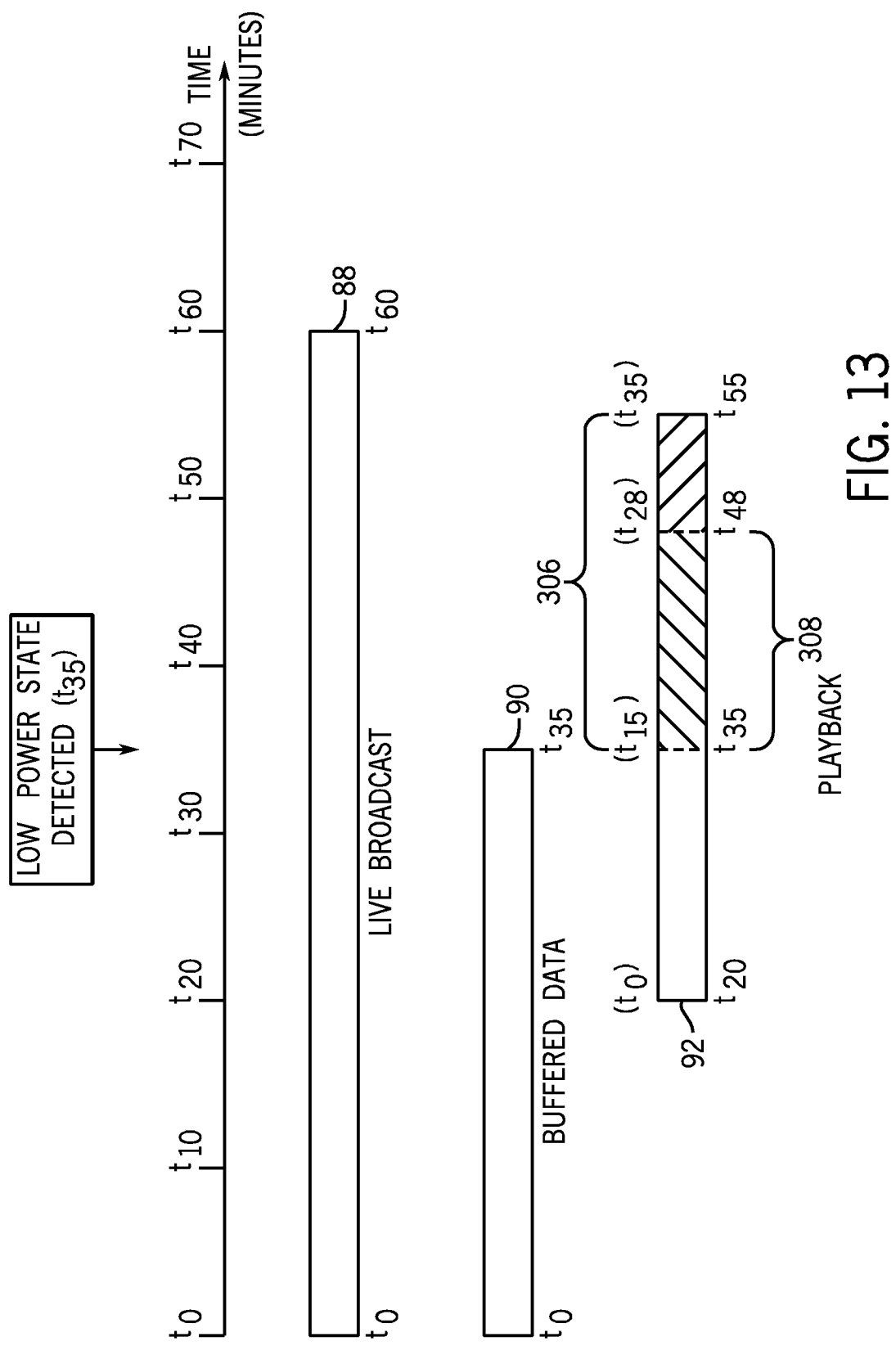
Figure 14:
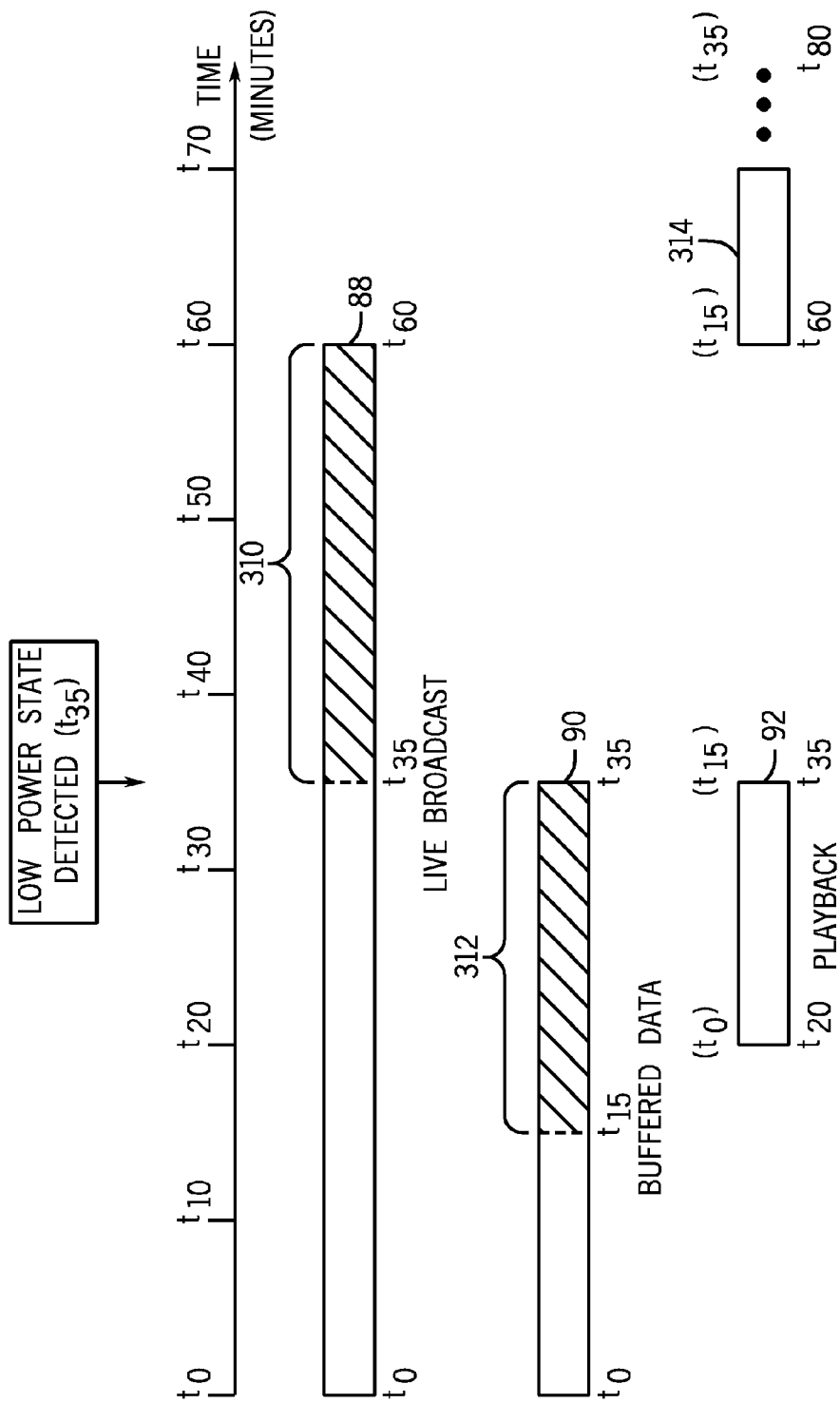

Keeping the techniques illustrated by the screen images of FIGS. 10 and 11 in mind, FIGS. 12-14 provide graphical timelines which are similar the timelines depicted above in FIG. 8, but further illustrating the operation of device 10 (or 38) over time based upon the selecting the various low power options shown in window 272 of FIG. 1. Particularly, the illustrated graphical timelines shown in FIGS. 12, 13, and 14 correspond to the selection of low power actions represented by graphical buttons 274, 276, and 278, respectively. Again, it should be understood that the time values shown in these graphical timelines may correspond to the times used in the examples illustrated in FIGS. 10 and 11, i.e., minutes t0 to t60 correspond to 2:00 PM to 3:00 PM.

Thus, referring first to FIG. 12, the illustrated graphical timeline is intended to illustrate the operation of device 10 when a user, in response to being prompted to select a low power action, selects graphical button 274. As discussed above, the selection of graphical button 274 stops the playback function but continues buffering for 20 minutes. As shown, live broadcast 88 occurs from time t0 to time t60. At time t0, device 10 initiates buffering 90 of the live broadcast 88. At time t20, buffered playback 92 is initiated by the user, as shown by screen 180 of FIG. 10. Thereafter, a low power state is detected at time t35, and playback 92 ends while buffering continues for 20 minutes from time t35 to time t55, as indicated by interval 302.

FIG. 13 depicts the operation of device 10 when graphical button 276 is selected, thus stopping the buffering function but continuing playback of data that is already buffered. For instance, as shown in FIG. 13, the buffering 90 of live broadcast 88 begins at time t0, and the buffered playback 92 begins at time t20. When the low power state is detected at time t35, device 10 stops the buffering process 90. At this point, there is 35 minutes of audio broadcast data stored in the buffer. However, because playback 92 began at time t20, 15 minutes of the buffer (corresponding to time t0 to t15 of live broadcast 88) have been played back, thus leaving 20 minutes (corresponding to time t15 to t35 of live broadcast 88) that have not yet been played back. As discussed above, depending on the remaining power, device 10 may continue to playback the entire remaining 20 minutes of buffered audio data, or only a portion of the remaining buffered data. For example, assuming that there is sufficient power to playback the entire remainder of the buffer, playback 92 may continue from time t35 to time t55, as shown by interval 306. Referring to window 290 of FIG. 11, if the remaining power is only sufficient to play back a portion, i.e. 13 minutes, of the remaining buffered data, then device 10 may continue playback from time t35 to time t48, as shown by interval 308.

Referring lastly to FIG. 14, a graphical timeline depicting the operation of device 10 when a user chooses to stop both playback and buffering functions and to output the live broadcast, is illustrated. As will be understood, the graphical timeline of FIG. 14 may correspond to the selection of graphical button 278 of FIG. 11. Like FIGS. 12 and 13, buffering of live broadcast 88 begins at time t0, and the playback 92 of the buffered audio data begins at time t20. Thus, when the low power state is detected at time t35, the portion of live broadcast 88 from time t0 to time t35 is buffered, and the first 15 minutes of the buffered data 90 have been played back. However, due to the selection of graphical button 278, both the buffering and playback functions are stopped at time t35, and device 10, assuming that there is sufficient power, begins outputting live broadcast 88 from time t35 to the end of the scheduled broadcast time t60. Accordingly, by the end (time t60) of live broadcast 88, device 10 will have outputted, either live or via buffered playback, all of the live broadcast 88 except for the buffered data 312 that corresponds to portion of live broadcast 88 between times t15 and t35. As discussed in FIG. 11, device 10 may, in some embodiments, resume playback of the unplayed portion 312 of the buffer. Thus, as shown in FIG. 14, if the user selects to resume playback following the conclusion of live broadcast 88, playback of the unplayed buffered data 312 may resume at time t60 and continue to time t80 (not shown), as shown by reference number 314.

As can be appreciated, when compared to the embodiments described in FIGS. 5-8, in which device 10 is configured to implement low power actions based on one or more low power settings configured by the user prior to the detection of a low power state, the embodiments set forth in FIGS. 9-14 may give a user more flexibility in selecting a particular low power action to perform when low power states are encountered during device operation. For instance, the selection of the low power action may be at least partially based upon the user's subjective appreciation of the live broadcast up to the point at which a low power state is detected. For instance, if the user enjoys the live broadcast and finds the subject matter to be entertaining, the user may select a low power action that generally provides the greatest prolongment in battery life in order to listen to as much of the broadcast as possible. For instance, as shown in FIG. 14, this may include switching to the live broadcast while disabling buffering and playback functions during a low power state, and resuming playback of the buffered portions when the power source is recharged, or if the electronic device determines that there is sufficient power to do so even after the conclusion of the live broadcast. Additionally, if the user finds the live broadcast to be unenjoyable and/or only intends to listen to a relatively short portion of the live broadcast, then the user may select a less economical low power action (e.g., one which continues one of buffering or playback functions), or may choose not to implement any low power actions (e.g., selection of graphical button 280 of FIG. 11).

Still further, although not specifically illustrated in the figures above, it should be understood that in certain embodiments, additional actions that are not necessarily related to the playback or buffering of audio broadcast data may also be performed in conjunction with the above-discussed low power options to further reduce power consumption and prolong battery life. By way of example, such additional actions that may be implemented during low power states could include reducing a brightness level of display 28, temporarily powering off display 28, reducing a compression bit-rate used during the encoding process, powering off network device 24, or disabling one or more other functions of device 10, and so forth.

As will be understood, the various techniques described above and relating to the management of audio broadcast functions (e.g., buffering, playback, and live output) during low power states are provided herein by way of example only. Accordingly, it should be understood that the present disclosure should not be construed as being limited to only the examples provided above. Indeed, a number of variations of the power management techniques set forth above may exist. Further, it should be appreciated that the above-discussed techniques may be implemented in any suitable manner. For instance, audio broadcast processing logic 32 of FIG. 3, which is configured to implement various aspects of the present techniques, may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
   an audio broadcast receiver configured to receive live audio broadcast data;
   an audio output device configured to output audio data;
   a power source configured to provide power to the electronic device; and
   processing logic configured to initiate buffering of the live audio broadcast data at a first time and to initiate playback of the buffered live audio broadcast data at a second time subsequent to the first time, wherein the processing logic comprises:
   encode/decode logic configured to encode the live audio broadcast data using a codec during buffering and to decode the buffered live audio broadcast data using the codec during playback; and
   low power management logic configured to perform one or more low power actions when the electronic device is operating in a low power state, wherein the one or more low power actions comprises stopping at least one of buffering the live audio broadcast data or playback of the buffered live audio broadcast data while the audio broadcast receiver continues to receive the live audio broadcast data.

2. The electronic device of claim 1, wherein the low power management logic is configured to determine whether the electronic device is operating in the low power state by receiving, from a power management unit communicatively coupled to the power source, data indicative of an amount of power remaining in the power source, comparing the amount of power remaining to a low power threshold, and determining that the electronic device is in the low power state if the amount of power is less than the low power threshold.

3. The electronic device of claim 1, wherein the one or more low power actions are determined based upon a set of low power settings configured by a user of the electronic device prior to detection of the low power state.

4. The electronic device of claim 3, wherein the electronic device comprises a display device, and wherein the low power settings are configurable by the user using a graphical user interface displayed on the display device.

5. The electronic device of claim 1, wherein the low power management logic is configured to determine the one or more low power actions by prompting a user to select a low power action from a plurality of low power actions that may be performed by the low power management logic upon detection of the low power state, and to select one of the plurality of low power actions in accordance with a user selection input received in response to the prompt.

6. The electronic device of claim 5, wherein the plurality of low power actions that may be performed by the low power management logic during the low power state comprises:

stopping the playback of the buffered live audio broadcast data using the audio output device while continuing to buffer the live audio broadcast data;

stopping the buffering of the live audio broadcast data while continuing the playback of the buffered live audio broadcast data; or stopping both the buffering of the live audio broadcast data and the playback of the buffered live audio broadcast data and outputting the live audio broadcast data to the audio output device.

7. The electronic device of claim 5, wherein the prompt further provides the user with a selectable option to not perform any low power actions during the low power state.

8. The electronic device of claim 1, wherein the encode/decode logic is configured to compress the encoded live audio broadcast data to (a) a first compression bit-rate when the electronic device is not operating in a low power state, and (b) a second compression bit-rate when the electronic device is operating in the low power state, wherein the second compression bit-rate is lower than the first compression bit-rate.

9. The electronic device of claim 1, wherein the electronic device comprises a portable digital media player, and wherein the power source comprises one or more batteries.

10. The electronic device of claim 1, wherein the low power management logic is configured to stop performing the one or more low power actions if it is determined that the electronic device is no longer operating in the low power state.

11. The electronic device of claim 1, comprising at least one of a display device or a network device, wherein the low power management logic, upon detecting the low power state, is further configured to reduce a brightness level of the display device, temporarily power off the display device, power off the network device, or some combination thereof.

12. A method, comprising:
receiving live audio broadcast data on an electronic device;
initiating buffering of the live audio broadcast data at a first time;
initiating playback of the buffered live audio broadcast data at a second time subsequent to the first time;
encoding the live audio broadcast data using a codec during buffering;
decoding the buffered live audio broadcast data using the codec during playback; and
performing one or more low power actions when the electronic device is operating in a low power state, wherein the one or more low power actions comprises stopping at least one of the buffering of the live audio broadcast data or the playback of the buffered live audio broadcast data during the low power state while continuing to receive the live audio broadcast data.

13. The method of claim 12, comprising detecting whether the electronic device is operating in the low power state by comparing an amount of power remaining in a power source of the electronic device to a low power threshold value.

14. The method of claim 12, wherein the one or more of low power actions comprises:
a first action that stops the playback of the buffered live audio broadcast data while continuing to buffer the live audio broadcast data;
a second action that stops the buffering of the live audio broadcast data while continuing the playback of the buffered live audio broadcast data; and
a third action that stops the buffering of the live audio broadcast data, stops the playback of the buffered live audio broadcast data, and starts outputting the live audio broadcast data.

15. The method of claim 14, comprising, if the first action is performed:
stopping the playback of the buffered live audio broadcast data;
determining an amount of time that the electronic device is able to continue buffering the live audio broadcast data based upon an amount of power remaining in a power source;
informing a user of the determined amount of time; and
continuing to buffer the live audio broadcast data for the determined amount of time.

16. The method of claim 14, comprising, if the second action is performed:
stopping the buffering of the live audio broadcast data; and
playing back at least a portion of unplayed buffered live audio broadcast data stored on the electronic device.

17. The method of claim 16, wherein playing back at least a portion of unplayed buffered live audio broadcast data comprises:
determining an amount of unplayed buffered live audio broadcast data stored on the electronic device;
determining whether the electronic device is able to play back all of the unplayed buffered live audio broadcast data based upon an amount of power remaining in a power source;
playing back all of the unplayed buffered live audio broadcast data if the amount of power remaining is sufficient; and
if the amount of power remaining is not sufficient to play back all of the unplayed buffered live audio broadcast data, identifying the of the unplayed buffered live audio broadcast data that the electronic device is able to play back based upon the remaining power, and playing back the identified portion.

18. The method of claim 12, comprising providing a user with the one or more low power actions by displaying the plurality of low power options as a listing of selectable options on a display of the electronic device.

19. One or more tangible computer-readable storage media having instructions encoded thereon for execution by a processor, the instructions comprising:
code to cause live audio broadcast data received by an electronic device to be encoded and buffered beginning at a first time;
code to cause the buffered live audio broadcast data to be decoded and played back beginning at a second time subsequent to the first time; and
code to cause one or more low power actions to occur when the electronic device is operating in a low power state, wherein the one or more low power actions comprises stopping at least one of buffering of the live audio broadcast data or playback of the buffered live audio broadcast data during the low power state while continuing to receive the live audio broadcast data.

20. The one or more tangible computer-readable storage media of claim 19, comprising:
code to cause the live audio broadcast data to stop being outputted at a conclusion of the live audio broadcast data;
code to identify unplayed buffered live audio broadcast data stored on the electronic device;
code to determine whether the electronic device has sufficient power at the conclusion of the live audio broadcast data to play back at least a portion of the unplayed buffered live audio broadcast data; and code to cause the portion of the unplayed buffered live audio broadcast data to be played back if the electronic device has sufficient power.

21. The one or more tangible computer-readable storage media of claim 19, comprising:

code to cause stopping the buffering of the live audio broadcast data, stopping the playback of the buffered live audio broadcast data, and starting of outputting the live audio broadcast data as one or more low power actions.

* * * * *